US005764985A

United States Patent [19]
Smale

[11] Patent Number: 5,764,985
[45] Date of Patent: Jun. 9, 1998

[54] NOTIFICATION MECHANISM FOR COORDINATING SOFTWARE EXTENSIONS

[76] Inventor: Leonard T. Smale, 9820 159th Pl. NE., Redmond, Wash. 98052

[21] Appl. No.: 884,430

[22] Filed: Jun. 27, 1997

Related U.S. Application Data

[63] Continuation of Ser. No. 354,630, Dec. 13, 1994, abandoned.

[51] Int. Cl.$^6$ .................................................. G06F 15/163
[52] U.S. Cl. .................................................. 395/682
[58] Field of Search ................................. 395/686, 682

[56] References Cited

U.S. PATENT DOCUMENTS

| 5,291,585 | 3/1994 | Sato et al. | 395/500 |
| 5,315,703 | 5/1994 | Matheny et al. | 395/507 |
| 5,329,619 | 7/1994 | Pagé et al. | 395/200 |
| 5,339,430 | 8/1994 | Lundin et al. | 395/700 |
| 5,560,022 | 9/1996 | Dunstan et al. | 395/750 |

OTHER PUBLICATIONS

King, Adrian, Inside Windows 95, Chapter 9, pp. 341–380, 1994.

*Primary Examiner*—Alvin E. Oberley
*Assistant Examiner*—Patricia Caldwell
*Attorney, Agent, or Firm*—Leydig, Voit & Mayer

[57] ABSTRACT

A method and system for coordinating software extensions by utilizing a central management system. One or more extensions register with the central manager, the extensions being capable of providing extended functionality to one or more lower level functions. As calls are made from an application program to a lower level function, the calls are intercepted at the central manager. Each of the appropriately registered extensions is then notified of the existence of the call, thereby allowing the extensions to provide extended functionality thereto.

The call is then passed by the manager to the lower level function, which returns a result of the call to the manager. The extensions are then notified of the result of the call. This enables the registered extensions to modify the result of the call to provide its extended functionality.

13 Claims, 15 Drawing Sheets

1

NOTIFICATION MECHANISM FOR COORDINATING SOFTWARE EXTENSIONS

This is a continuation of application Ser. No. 08/354,630 filed on Dec. 13, 1994, now abandoned.

FIELD OF THE INVENTION

The present invention relates generally to the field of computer systems, and more particularly to a mechanism within a computer system for coordinating extensions to user-accessible system functions.

BACKGROUND OF THE INVENTION

In conventional computer operating systems, application programs have common access to a number of system-provided software routines, such as service providers that provide low-level interfaces to hardware devices. Software developers often find it desirable to extend the functionality of these commonly-accessed routines, without modifying the routines themselves, by effectively adding additional software code thereto. At present, such extensibility is accomplished by loading the additional software code, known as an extension or a monitor, into the system memory and then employing a scheme to pass system calls placed by application programs to the extension instead of passing the calls to the system-provided routine. The extension thereby obtains control of the system calls.

By way of example, in the Microsoft® MS-DOS® operating system, a typical extension to a software interrupt is implemented in a terminate and stay resident (TSR) routine. With a TSR, the functionality of the software interrupt may be enhanced by substituting the address of the TSR in the interrupt vector table in place of the address of the software interrupt handler. If a similar substitution has previously occurred, the new TSR address is substituted for the old TSR address. This process is typically known as chaining, as it allows a number of extensions to be serially chained together, with the most recently-loaded extension having its address in the interrupt vector table. Since at the time of its initial execution the TSR substitutes its own address for that of an interrupt, (or another TSR), the TSR "hooks" the interrupt and takes control of the request each time the corresponding interrupt function is called with a request from an application program.

Once in control of the request, the TSR evaluates it. The TSR may decide to handle the request entirely itself, or instead pass it to the interrupt whose address it replaced, possibly modifying the request in some way before making the call. If the TSR calls the interrupt, it may also modify the values returned thereby. In this manner, the extensions are capable of providing the desired extensibility to selected requests.

Similarly, in operating systems having layered subsystem architectures, such as Microsoft® Windows™, application programs call application program interfaces (APIs) to access the various lower-level system functions. The API layer passes the call to a lower level of code, such as a routing module, where it is subsequently passed to a service provider. From there it may be passed to the operating system or further passed through lower layer interfaces to other modules before ultimately reaching an appropriate hardware driver. It is thus possible to employ a scheme at the routing module (or at a lower level module) wherein the function call is replaced by a call to an extension, thereby providing extensibility to the function call.

The main problem with the above schemes, and others similar to it, is that each extension is essentially independent of other such extensions. As a result, the operation of an extension is often negatively impacted by the operations of other extensions which it knows nothing about. For example, problems frequently arise because of the order that the extensions are loaded into the system, such as when a second, subsequently loaded extension mistakenly fails function calls that are intended to be handled by a first, previously loaded extension.

Extensions must also be written to understand many of the behaviors of the function being extended in order to properly deal with various types of calls thereto. Moreover, extensions are unable to pass calls to extensions loaded after them, thereby reducing the flexibility and usefulness of extensions. As a result, it is often necessary to alter an existing extension rather than adding additional extensions in order to further modify the behavior of a called function.

In addition, when employing the above-described address-substitution scheme, the extensions must independently evaluate each function call to determine whether it wants to handle the call or pass it on to the interrupt handler. As a result, each extension possesses a substantial amount of repetitive code for determining if each function call passed thereto is within its area of interest.

Finally, it is readily apparent that the above-described scheme does not facilitate the dynamic loading or unloading of extensions, since an extension is unaware of whether (or how many) other extensions have been loaded before or after it. For example, when a plurality of extensions are chained together, it is not possible to simply unload an extension in the middle of the chain by simply restoring the address of the routine it replaced in the interrupt vector table. Such a restoration would create problems if a subsequently-loaded extension decided not to handle a call and attempted to pass it to the address of the now-unloaded extension.

OBJECTS AND SUMMARY OF THE INVENTION

Accordingly, it is a primary object of the present invention to provide a method and system that coordinates software extensions thereby eliminating the deficiencies associated with independent extensions.

More particularly, it is an object to provide a method and system for extending a called software routine without relinquishing control of the call to an extension.

It is another object to provide a method and system of the above kind that allows extensions to operate correctly regardless of the order in which they were loaded.

It is yet another object to provide a method and system as characterized above that eliminates the need for individual extensions to manage the flow of control for function calls or handle the coordination of calls with other extensions.

It is still another object to provide such a method and system that enables existing extensions to be further extended.

Another object of the invention is to provide a method and system as characterized above that facilitates the dynamic loading and unloading of extensions.

It is another object to provide a method and system of the above kind that functions within a layered operating system such as the Microsoft® Windows™ 95 system architecture.

It is still another object to provide a method and system as characterized above that provides a mechanism for coordinating extensions to networking functions.

Briefly, the invention provides a system and method for coordinating extensions by utilizing a central management system. One or more extensions register with the central manager, the extensions being capable of providing extended functionality to one or more lower level functions.

As calls are made from an application program to a lower level function, the calls are intercepted at the central manager. Each of the appropriately registered extensions is then notified of the existence of the call, thereby allowing the extensions to provide extended functionality thereto. For example, the extensions can cancel the call at this time.

If not cancelled, the call is passed by the manager to the lower level function, which returns a result of the call to the manager. The extensions are then notified of the result of the call. This enables the registered extensions to modify the result of the call, for example to retry the call.

Other objects and advantages will become apparent from the following detailed description when taken in conjunction with attached drawings, in which:

Figure 1:
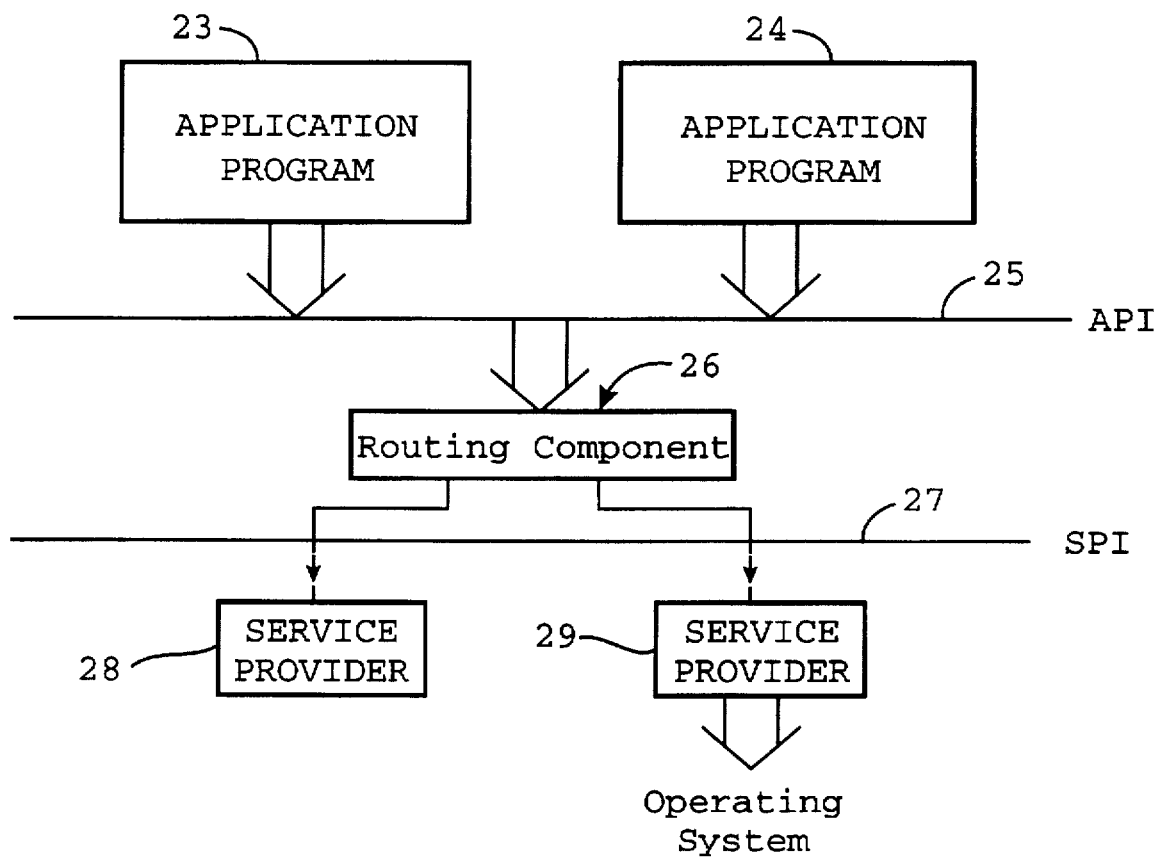
FIG. 1 is a block diagram illustrating a layered computer system architecture into which the system for coordinating extensions may be incorporated according to the present invention.

While the invention is amenable to various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Turning now to the drawings and referring first to FIG. 1, there is shown a layered software architecture into which a system for coordinating extensions may be incorporated in accordance with the present invention. Such a configuration is known as the Windows Open Services Architecture (WOSA), and is described in a publication by Adrian King entitled "Windows 95," Microsoft® Press, 1994, which is herein incorporated by reference.

In the WOSA configuration, application programs 23, 24 initiate function calls via an application program interface (API) 25 requesting the performance of various operations. From the API 25, the call is received by a routing component 26, which routes the requested function call through a service provider interface (SPI) 27 to one or more appropriate service providers. One of the service providers, e.g. service provider 28, may handle the request directly, or alternatively may call on other, lower-level service providers (not shown). Another service provider 29 is provided to call on operating system functions when so required by the requesting function call.

Figure 2A:
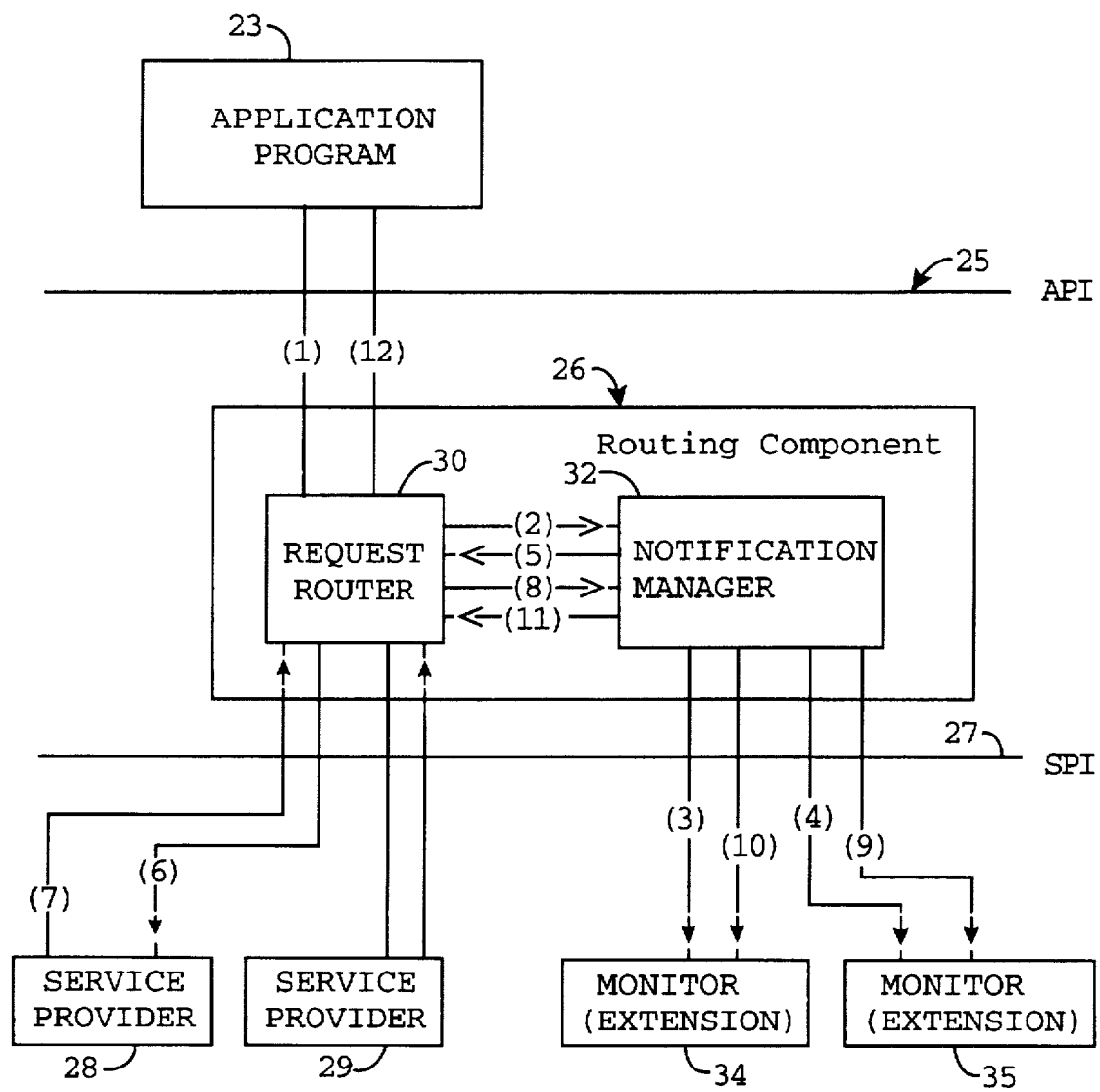
FIG. 2A is a diagram representing the general sequence of events that occurs when a typical function call to a service provider is made by an application program.
Figure 3:
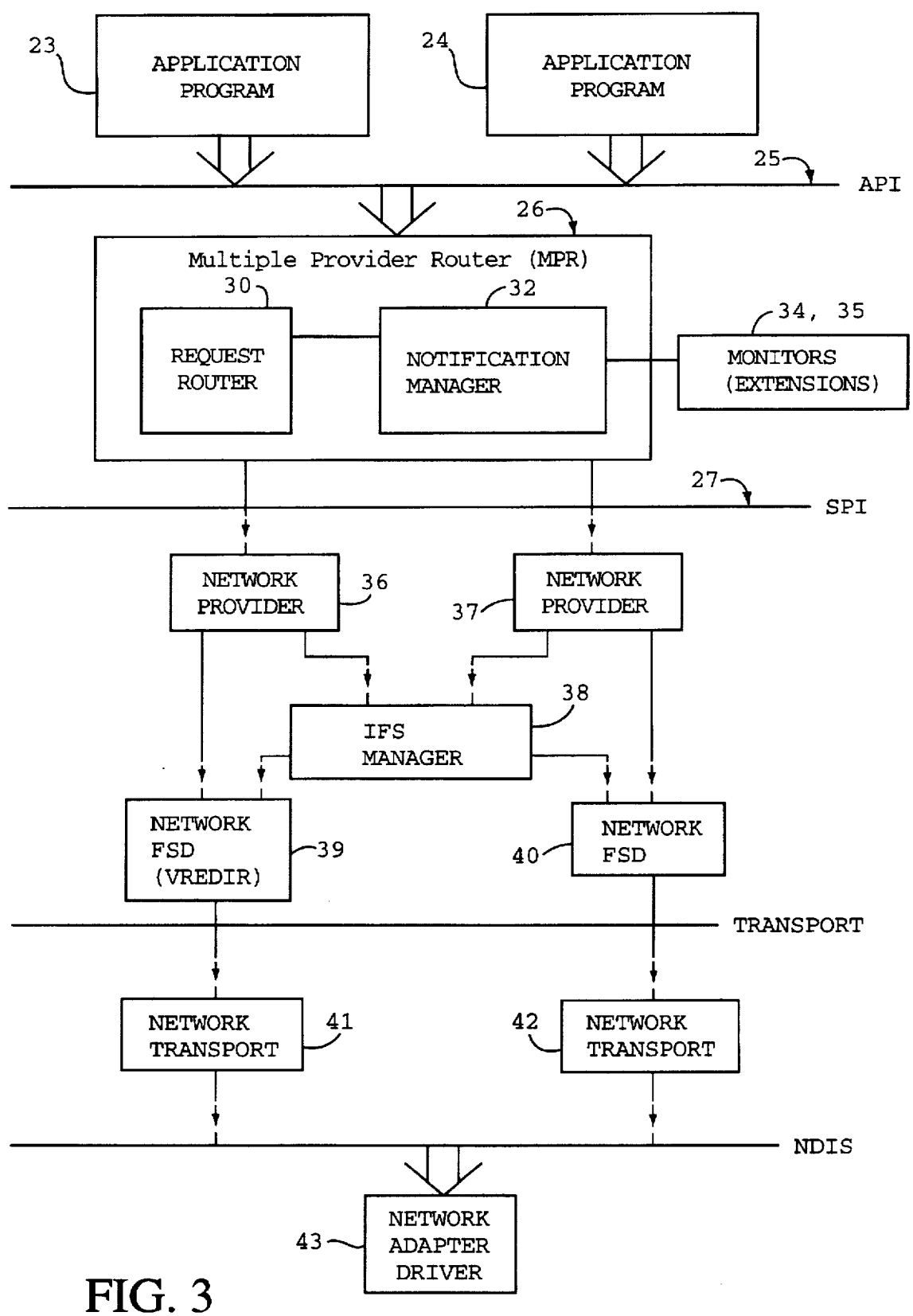
FIG. 3 is a block diagram illustrating a layered architecture for accomplishing networking functions into which the system and method of the invention has been incorporated.

In accordance with one aspect of the present invention and as best shown in FIGS. 2A and 3, the WOSA routing component 26 has been modified to include a notification manager 32. As described in more detail below, the notification manager 32 provides a centralized subsystem that notifies registered extensions 34, 35 of each function call both before (pre-notification) and after (post-notification) the call is made to the service provider.

Figure 2B:
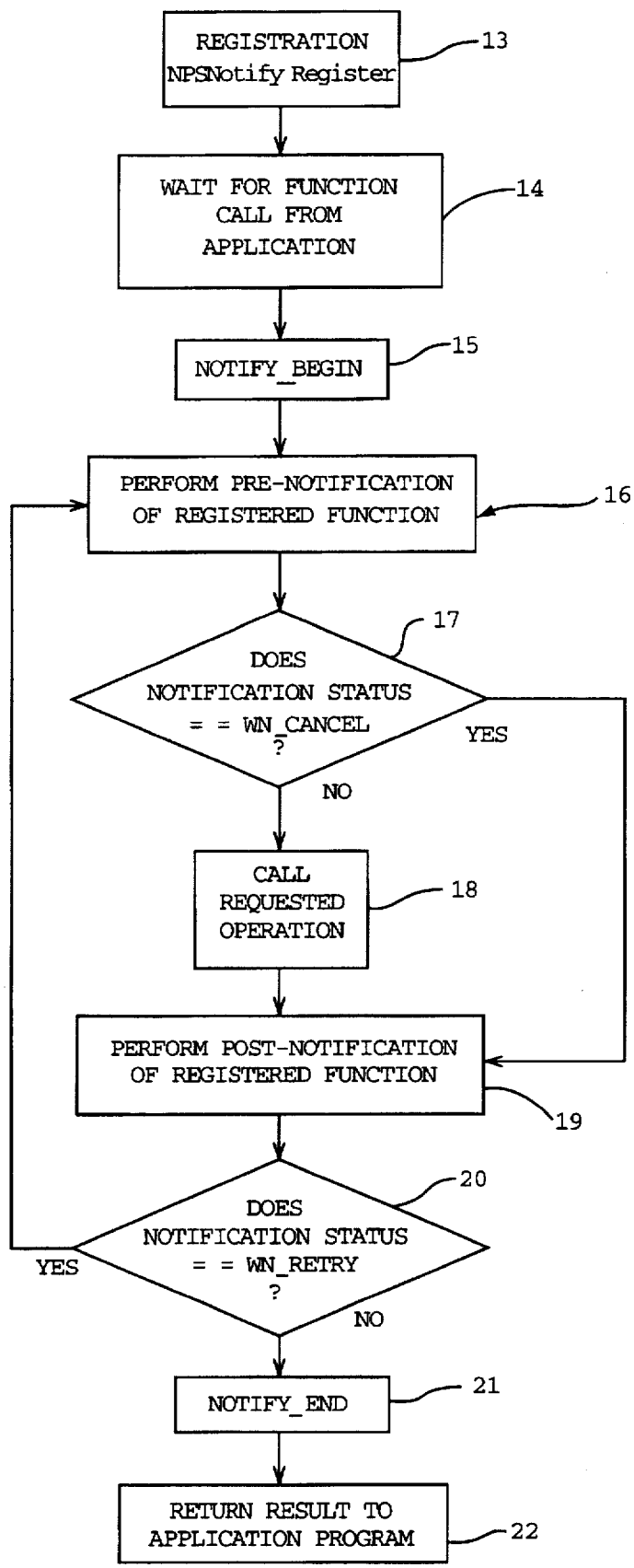
FIG. 2B is a flow diagram setting forth the various procedures executed when an application program calls a service provider to request performance of an operation.

FIG. 2A illustrates the general flow of operation when a typical function call is made from an application program. As previously described, with a layered architecture, a request router 30 of the routing component 26 initially receives the requesting call from the API 25, as indicated by step (1) of FIG. 2A. In keeping with the invention, at step (2) the function call is subsequently passed from the request router 30 to the notification manager 32. In turn, the notification manager 32 sequentially notifies each of the extensions 34, 35, at steps (3) and (4), respectively, of the pending call before the call is made (pre-notification). This pre-notification step is also shown in FIG. 2B as step 16.

During this pre-notification procedure the extensions 34, 35 are called, enabling the extensions to execute their own procedures and perform operations according to their extended functionality thereby providing extensibility to the pending operation request. However, as described in more detail below, the extensions 34, 35 are limited in how they can ultimately affect the subsequent passing of the pending request to the appropriate service provider.

Following pre-notification of the extensions, the notification manager returns control of the call to the request router 30 at step (5), which then routes the call to one or more appropriate service providers, such as the service provider 28, at step (6). The service provider 28 services the requesting call, and when completed, returns control to the request router 30 at step (7). The call or calls to the service providers are also shown in FIG. 2B as step 18. It should be noted that an extension can also be a service provider itself. Accordingly, service providers may register as extensions with the notification manager 32.

After the operation request has been passed to the service provider 28 and handled thereby, at step (8) of FIG. 2A the request router 30 again transfers control of the call to the notification manager 32. In keeping with the invention, at steps (9) and (10) the notification manager 32 notifies the extensions 34, 35 of the results of the call, (post-notification), giving the extensions 34, 35 an opportunity to again provide extensibility to the function call. During the post-notification, the extensions may, for example, influence the results returned from the called function, request a retry of a failed call, or execute their own procedures. By way of example, one of the extensions 34 may alter a result returned by the service provider indicative of failure, to fool the application program into believing that the call was successfully completed. Post-notification of the extensions is also shown in FIG. 2B as step 19.

Once the post-notification procedure is completed, the notification manager 32 returns control to the request router 30 at step (11). Finally, the request router 30 returns a result to the application program 23 at step (12) of FIG. 2A, (which corresponds to step 22 of FIG. 2B). As can be readily appreciated, the application program 23 is not necessarily aware that the extensions 34, 35 may have provided extended functionality to the original request. More significantly, the notification manager 32, rather than the individual extensions 34, 35, maintains control over the flow of operation for the call, thereby ensuring that the extensions are all notified and operate in an orderly, cooperative manner.

With the above-described procedural flow as a general framework, the invention will now be described with respect to a notification manager implemented in the Microsoft® Windows™ based operating system environment to provide coordinated extensibility to existing network communication functions. Although a networking example is described herein, it can be readily appreciated that such a notification manager can be implemented for coordinating extensions written to non-network related operation requests, and may be applied to other operating systems and environments.

Figure 4:
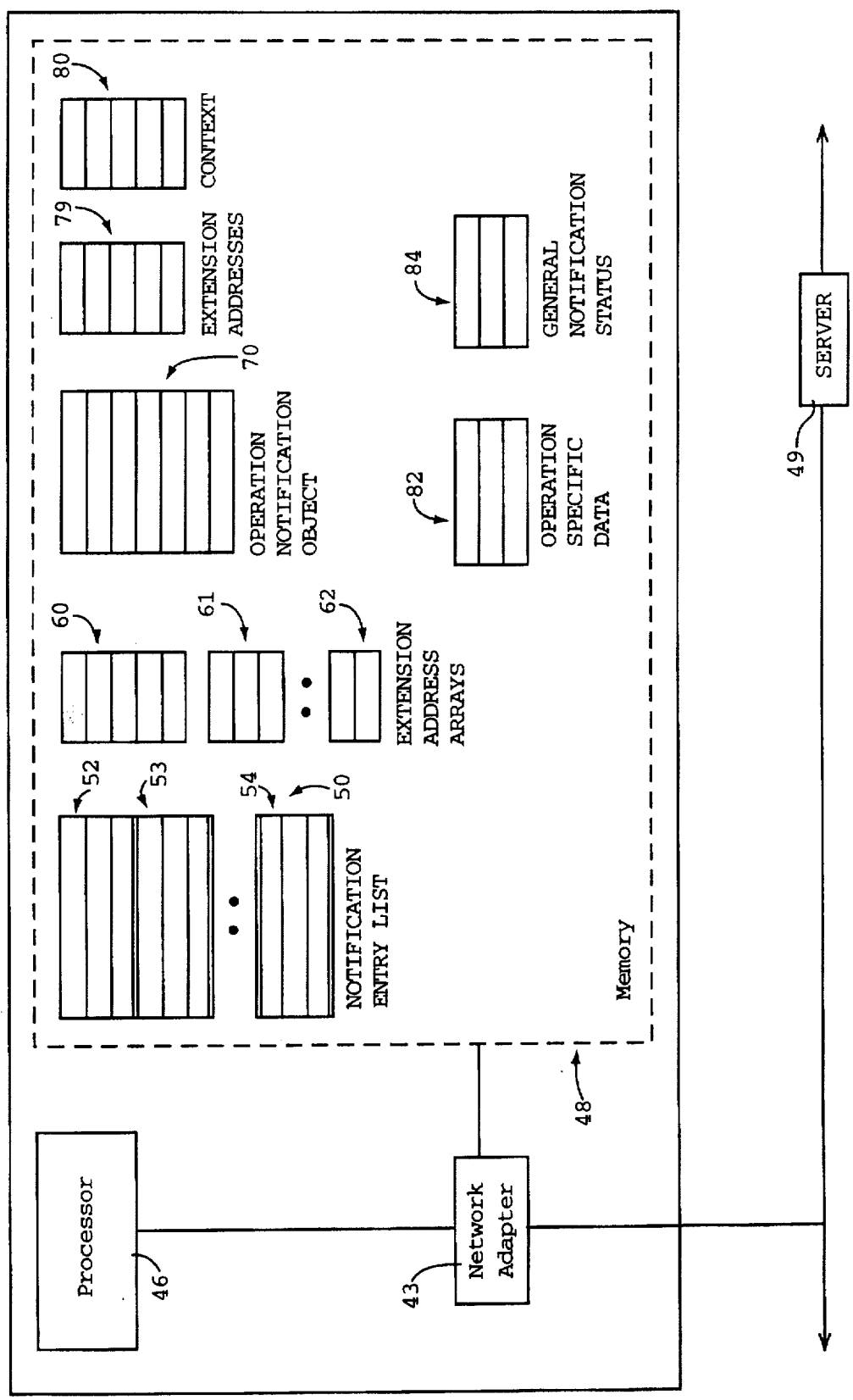
FIG. 4 is a functional block diagram illustrating components in a computer system and data structures reserved in a memory for providing extensibility to networking functions in accordance with the present invention.

In the present configuration, represented in FIG. 4, the hardware includes a processor 46 operatively connected to a memory 48. For network communications such as to a server 49, the processor 46 is also operatively connected to a network adapter 43, which may be any suitable input/output device along with any corresponding software and/or independent processing means for transmitting and receiving communications to and from a communications link. As is well known, conventional network adapters 43 are typically located on a motherboard or on a network card plugged into a personal computer, and may be arranged to directly access the memory 38 (DMA), use direct memory mapping, shared memory techniques or programmed input/output. A preferred system may be implemented with a protected mode Intel-386 or better microprocessor, using the Windows™ 95 operating system employing an NDIS 3.1 MAC (Media Access Protocol) driver.

As shown in FIG. 3, in the WOSA configuration the application programs 23, 24 interface to a network by making calls, via the API layer 25, to a routing component 26 known in Windows™ 95 as the Multiple Provider Router (MPR). In turn, the MPR 26 calls service providers via the service provider interface (SPI) 27. In a networking configuration, the service providers are more specifically described as network providers 36, 37 which implement the defined network service provider interface. In Windows™ 95, both the MPR 26 and the network provider modules 36, 37 are 32-bit protected mode dynamic link libraries (DLLs).

The network providers 36, 37 may pass file-related network requests to a lower-level IFS (installable filesystem) manager 38 which routes such filesystem requests to one of the appropriate network filesystem drivers (FSDs) 39, 40. Non-file related requests need not be passed to the IFS manager 38. Ultimately, however, all valid network requests reach one of the network transport drivers 40, 41, which implement the appropriate device-specific network transport protocol for the request, e.g., the IPX/SPX protocol. From there, using the Network Driver Interface Specification (NDIS) or a similar specification, the network transports 40, 41 interface to the network adapter driver 42 which controls the physical network hardware that places the request on the network as described in the aforementioned publication by Adrian King.

In operation, to accomplish the notification process, extensions desiring to provide extensibility to a network provider may register with the notification manager 32. This enables the notification manager 32 to compile a master list of the number and location of extensions, that are to be notified when operation requests are received. Although not necessary to the invention, for optimization purposes an extension also registers its area of interest, or type, with the notification manager 32 so that the notification manager 32 will only direct appropriate types of calls thereto. For such a case, the notification manager 32 is informed that an extension is interested in being notified only when an application program makes a specific type of call. Since the notification manager 32 is in control of the operation, each registered extension is only notified of corresponding types of calls and is not required to deal with unrelated calls. This eliminates a need for each extension to possess a substantial amount of repetitive code.

Registration of a networking extension, shown generally as step 13 of FIG. 2B, is accomplished by calling the notification manager 32 from an extension with a function identified as NPSNotifyRegister. Two parameters, Notify-Type and NotifyCallback, are passed to the notification manager 32 with the NPSNotifyRegister function call. NotifyType informs the notification manager 32 of the type of operation that the extension 34 is interested in evaluating. For example, with extensions for extending network functions, types include NotifyAddConnection, (notify if a request to add a connection is received), NotifyCancelConnection, (notify if a request to cancel connections is received), and NotifyGetConnectionPerformance (notify if a request seeking connection performance information is received).

The other passed parameter, NotifyCallback, provides the notification manager 32 with the address of the extension (which may alternatively be referred to as a notification callback procedure or a notification function) that is being registered. It is the address of this callback procedure that is subsequently called by the notification manager 32 for notification purposes whenever operations corresponding to its interest type are requested by application programs.

Figure 8:
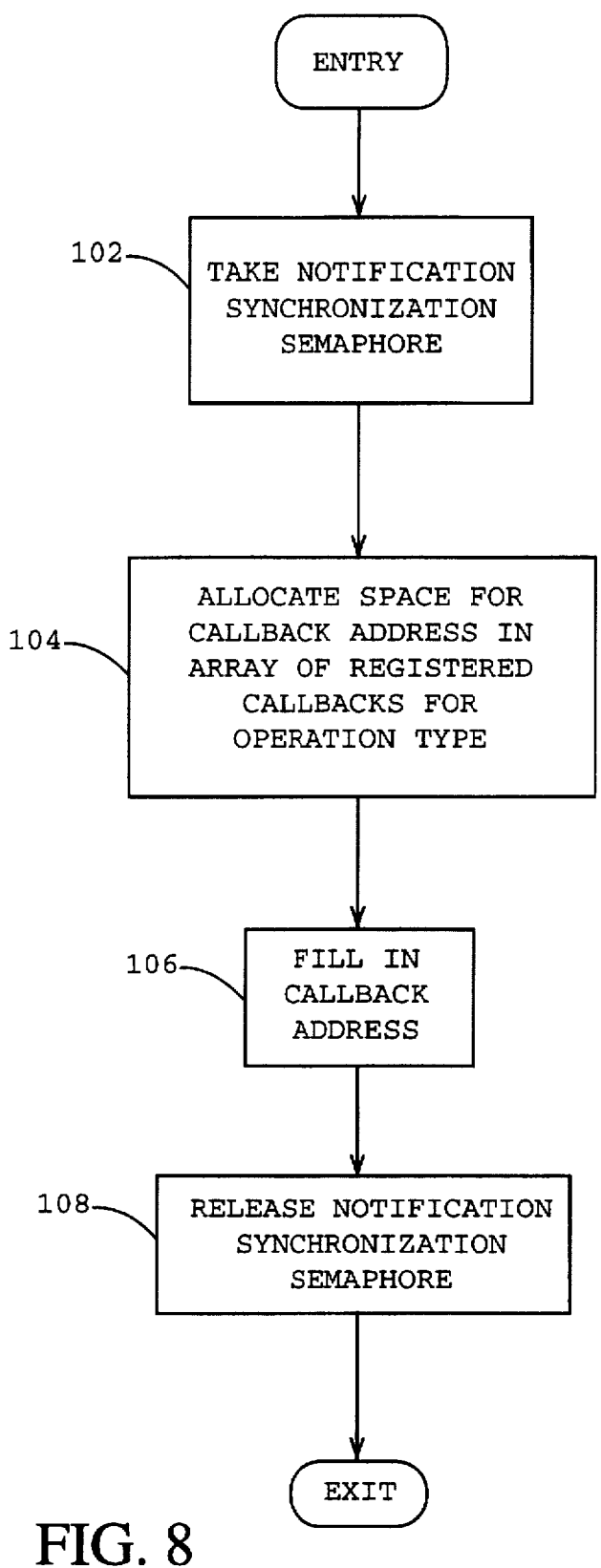
FIG. 8 is a flow diagram illustrating the steps taken when an extension registers with the notification manager.

FIG. 8 shows the steps taken during execution of the NPSNotifyRegister routine. Because Windows 95 is multitasking, and at least one other function (NotifyBegin, described below) captures a current copy of the registered callback procedures, a semaphore or mutual exclusion service (mutex) is employed by NPSNotifyRegister to prevent race conditions. Thus, as shown at step 102 of the flowchart FIG. 8, the initial step in registering an extension is to take control of a notification synchronization semaphore. If another function such as NotifyBegin possesses the semaphore, then NPSNotifyRegister must wait to take control.

Once in control of the semaphore, at step 104 the NPSNotifyRegister function allocates space for the passed extension address parameter (NotifyCallback), provided that sufficient space is available in the notification manager 32 of MPR 26. In this manner, as the extensions register, the notification manager 32 accumulates information about the extensions in a master list 50 of registered extensions as best shown in FIGS. 4 and 5.

As a result, the notification manager 32 has access to registered entries for all valid operation types that can be extended. The master list 50 comprises, for example, multiple data structures 52–54 which contain information about the registered extensions indexed by the operation type (NotifyType) passed thereto, such as NotifyAddConnection or NotifyCancelConnection.

Figure 5:
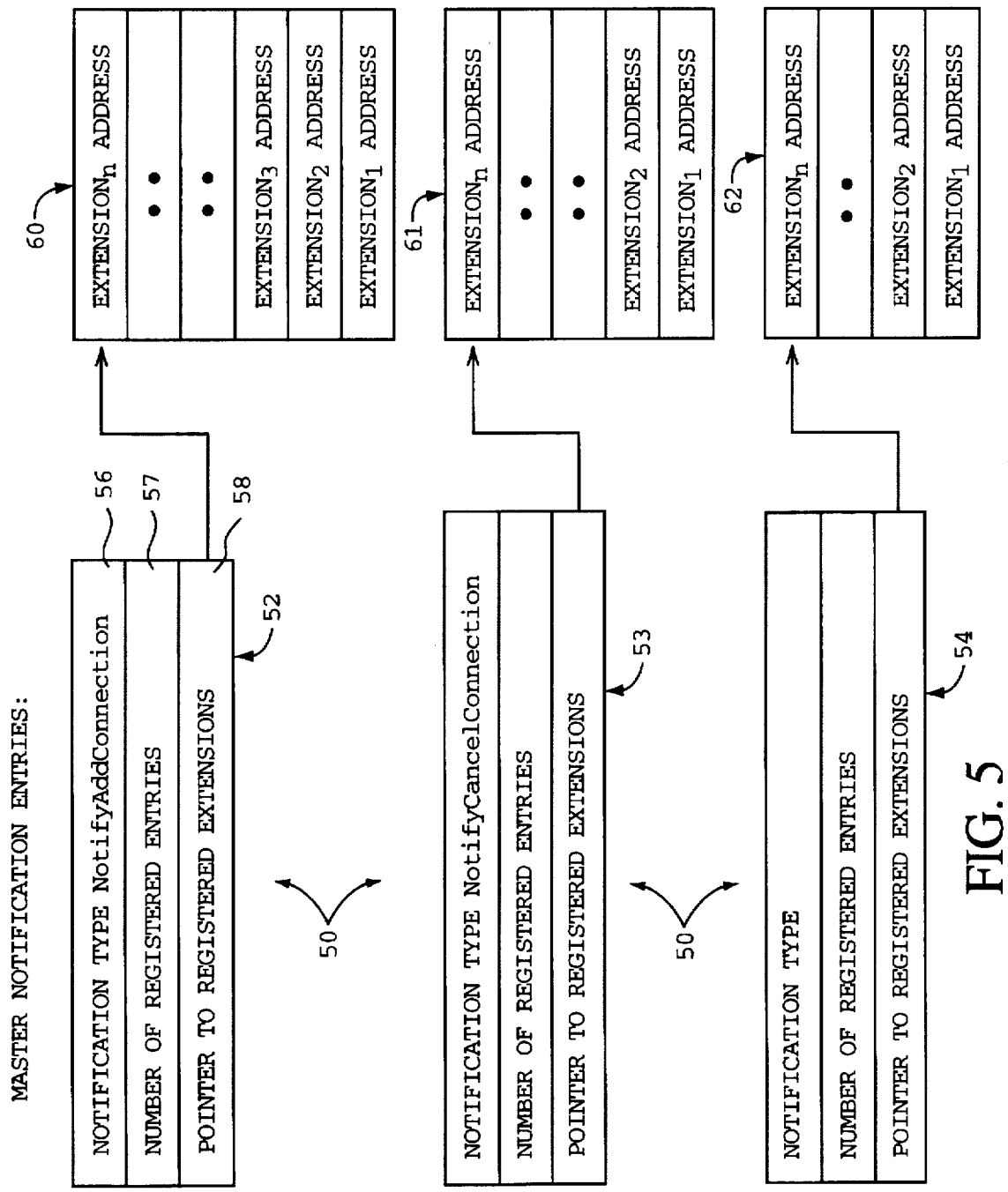
FIG. 5 illustrates the structure of the data entries that provide a master list of registered extensions and their addresses separated according to their type.

By way of example, as best shown in FIG. 5 the data structure 52 contains information relating to all extensions of the type registered for notification when requests to add connections are received, as identified by the type information stored in a first field 56 therein. Another memory location, field 57 contains a counter to track the number of extensions registered for this particular type of request. The counter is incremented whenever an extension of the corresponding type registers, and is decremented as an extension de-registers. Finally, a field 58 contains a pointer identifying the location of an array 60 (or a list or table) wherein the addresses of the extensions registered for this type of request are located.

As shown in FIGS. 4 and 5, other types of registered extensions have similar data structures 53, 54 within the master entry list 50. As with data structure 52, each structure 53, 54 is indexed by its type, contains a counter for the registered extension entries for that type, and includes a field containing a pointer to its corresponding address array, 61, 62 respectively.

Continuing with the flowchart of FIG. 8, once the space has been allocated, at step 106 the NPSNotifyRegister function writes the passed callback address into the space allocated therefor in the extension address array 60. At this time the registration procedure is essentially completed for this extension and at step 108 the notification synchronization semaphore is released.

The NPSNotifyRegister function returns one of three values to the extension requesting the registration. A first value, WN_SUCCESS, indicates that the extension is registered and will be notified as requests from application programs corresponding to its interest type are received at the MPR 26. A second value, WN_BAD_VALUE indicates either that the passed NotifyType parameter was not a valid operation type, (and thus no corresponding data structure exists in the master list), or that a NULL extension address was received for the NotifyCallback parameter. A third value, WN_OUT_OF_MEMORY, is returned when the notification manager 32 did not have enough memory to register the extension. When the second or third values are returned, the extension attempting registration is thus made aware that the extension was not registered.

While other extensions may register immediately thereafter in the same manner, sequential registration is not necessary to the invention. Indeed, extensions may be registered at any time by calling NPSNotifyRegister, for example as network adapters are plugged into a computer.

Moreover, it can be appreciated that a similar routine may be called to unload an extension. To accomplish de-registration, a synchronization semaphore is employed to avoid conflicts with other routines as previously described. In other steps the appropriate counter for registered entries in the master notification list 50 is decremented, and the array of registered entries is rearranged to remove the de-registered extension. Note that for proper operation, the extensions may need to be written to internally handle de-registration, such as by dealing with input/output (I/O) rundown considerations.

After at least one extension has been registered and a valid function call from the API 24 is received at the notification manager 32, the notification manager 32 executes a preliminary procedure to prepare for the pre-notification of the appropriate types of extensions. It should be noted that invalid function calls from application programs (e.g. calls passing in bad parameters) are ordinarily detected at the MPR 26 and returned to the application program without ever reaching the notification manager.

The MPR 26 also recognizes the function call and takes steps to prepare the call for routing and/or notification. For example, the various function calls that deal with connections (e.g., WNetAddConnection, WNetAddConnection2 and WNetAddConnection3) are first translated by the MPR 26 to the more general WNetUseConnection function call having the proper parameters arranged therefor. At this time the MPR 26 identifies the type of a function call (NotifyAddConnection) for the notification process.

Figure 9:
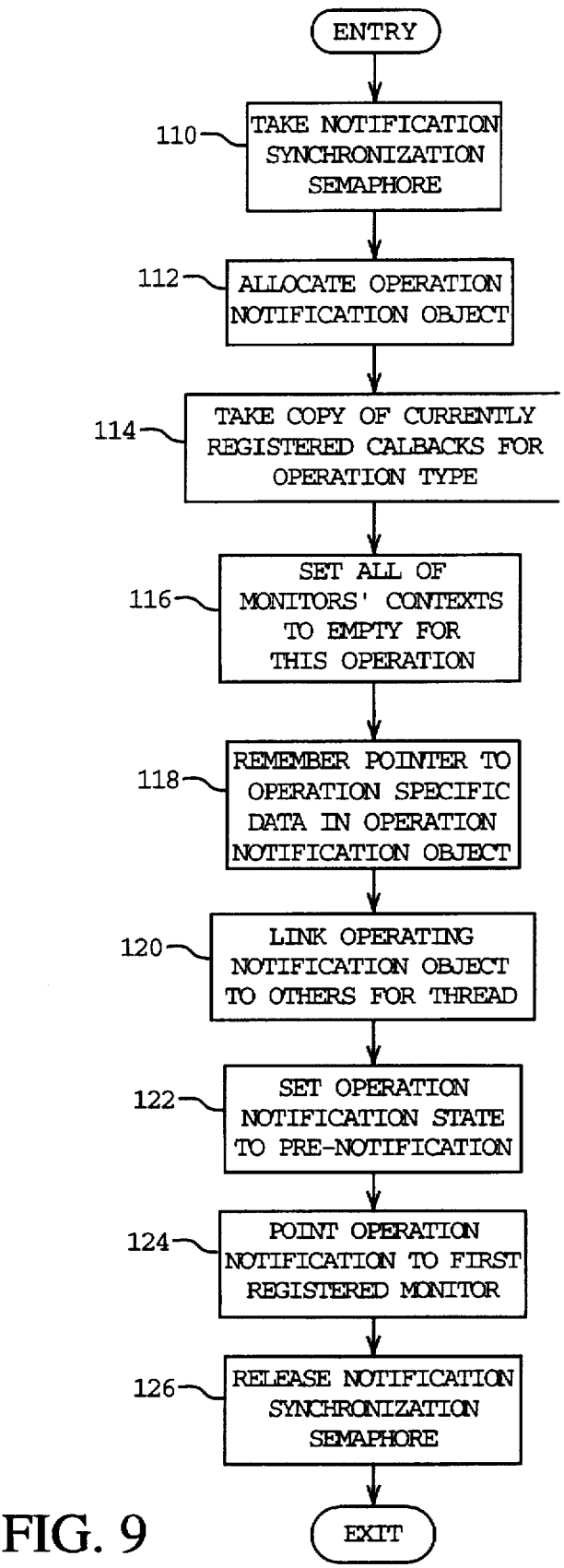
FIG. 9 is a flow diagram illustrating the steps taken by the notification manager to prepare for notification of the extensions when a function call has been received.

FIG. 9 represents the flow of the preliminary notification procedure, NotifyBegin, also shown generally as step 15 of FIG. 2B. When called, the NotifyBegin procedure is passed a value indicating the type of function requested by the application program and a pointer to a memory location containing the operation specific data that the application program passed with its function call.

Figure 6:
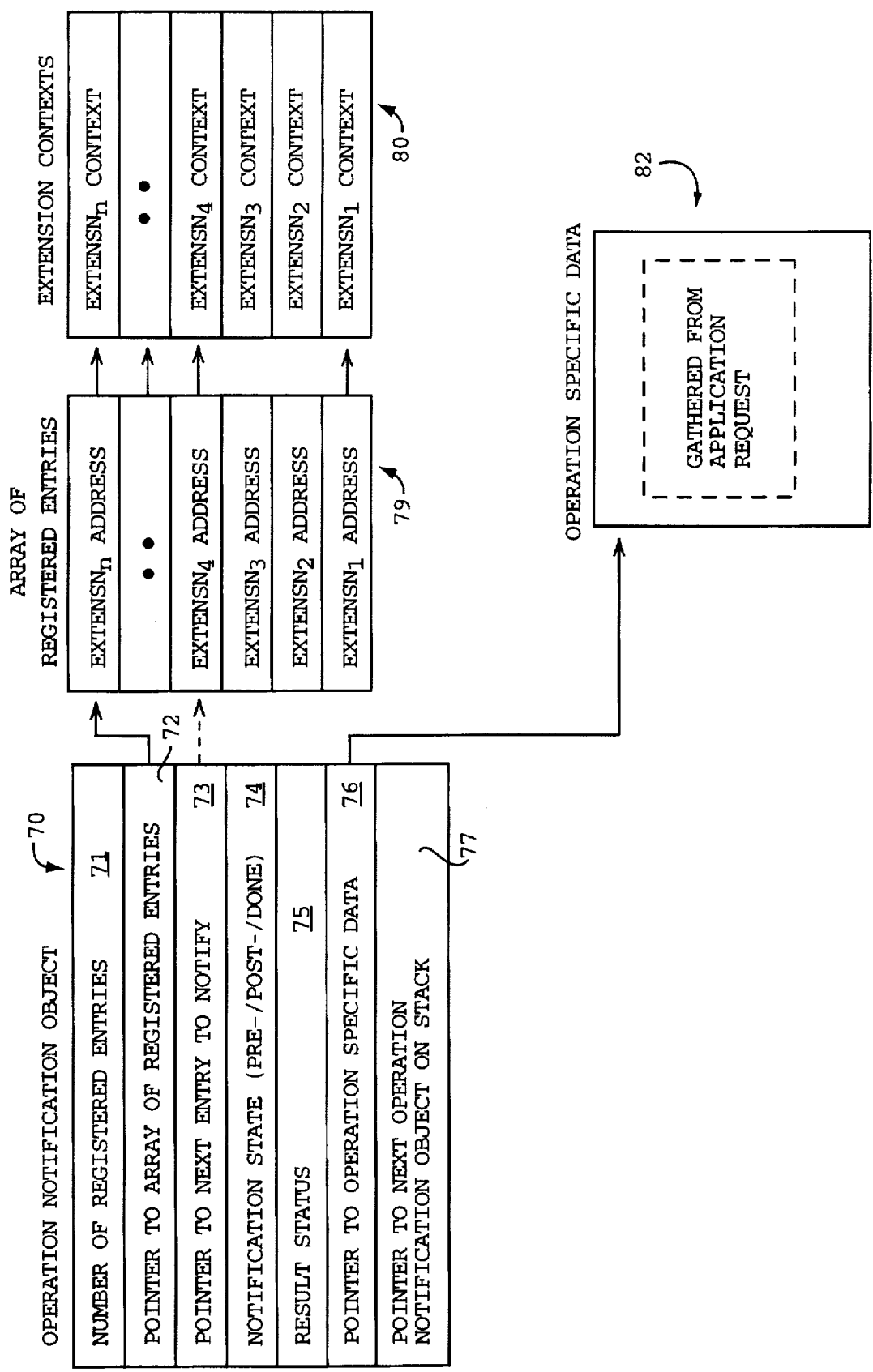
FIG. 6 illustrates the data structure of an operation notification object allocated for a particular type of registered extension.

Initially, at step 110, the NotifyBegin procedure takes the notification synchronization semaphore to prevent a race condition with the NPSNotifyRegister routine as previously described. Next, at step 112, a data structure known as an operation notification object 70 is allocated for this operation. As best shown in FIG. 6, the operation notification object maintains information related to the particular notification about to take place for the received function call.

At step 114 of FIG. 9, the NotifyBegin procedure obtains a copy of the data structure, e.g. data structure 52, from the master list 50 of data structures shown in FIG. 5. Note that by taking the semaphore at step 110, a registration is prevented from occurring as the copy is obtained.

Step 114 essentially takes a snapshot of the appropriate data structure in the master list 50 of registered entries for the following notification process, preventing any subsequent extensions corresponding to this type of notification from being registered for this particular requested operation. Obtaining a snapshot of the appropriate data structure in the master list 50 also enables the master list 50 to be updated (after the semaphore is released) via subsequent registrations, without adversely affecting the current notification process for the pending operation request. As an optimization, the copy need not be made and the procedure exited if no extensions are currently registered for the type of operation requested.

For example, when a request to add a connection is received, e.g. the function call WNetAddConnection2 is made by an application program. NotifyBegin copies the information from the master list 50 into the operation notification object 70. The information copied includes the number of registered entries from field 57. The pointer to the array of registered extensions in field 58 is then used to copy the extension addresses in the address array 60 to an array 79 (or a list or table) reserved for the addresses of the currently registered extensions that are of the type NotifyAddConnection.

Other fields in the operation notification object 70 include field 72, reserved for a pointer to the next entry in the array of current extensions 79 that is to be notified, field 73, reserved for an attribute that keeps track of the state of the notification process, and field 75 reserved for storing the result that is returned from the operation. Remaining fields include field 76, reserved for a pointer to the operation specific data block 78 which is originally gathered with the application program's requested function call, and field 77, which keeps a pointer to the next operation notification object on the stack to link the operation notification object to others for the thread as described in more detail below.

At step 116 of FIG. 9, the contexts in data structure 80 associated with each of the extensions are cleared to NULL. As described in more detail below, a context is a handle, preferably a 32-bit value, to a block of information that enables an extension to communicate its state with itself between pre- and post-notifications for a particular operation. In addition the extension's context may be shared with the network provider implementing the requested operation. This enables the network provider to keep track of the currently executing operation. During pre-notification, an extension replaces the NULLed context with a handle to its actual context if it is interested in further notification for this operation.

Continuing with the NotifyBegin procedure, at step 118 the pointer to the operation specific data that was passed to the procedure is written into the field 76 of the operation notification object 70, as previously described. The operation specific data is thus accessible to the extensions for evaluation and possible modification.

While not necessary to the invention, at step 120, the notification object is placed in a linked list of operation notification objects for the current thread. This is done primarily so that the execution of another routine, NPSNotifyGetContext, described in more detail below, can locate the notification object that corresponds to this particular requested operation and thus locate its associated context.

Since the operation of the notification procedures and the registered extensions depends on whether the function call is about to be made or has already been made (pre-notification or post-notification), at step 120, the operation state maintained in field 74 is set to pre-notification. This informs the notification procedures and extensions of the current state so that they will perform properly.

Although many different priority schemes may be implemented, in the preferred embodiment of the present invention extensions are pre-notified of pending applications in the reverse order which they are registered by the net provider. Thus, for efficiency, at the time of registration the array 50 of addresses is preferably arranged in this reverse order of registration, and is copied in this order into array 79. However, it can be readily appreciated that because a centralized manager is in control of the operation, other hierarchical schemes may be employed. For example, the system can easily be modified such that each extension might also register a field indicative of a rank, with a higher ranked extension taking priority over a lower ranked one even if the lower ranked one is loaded earlier. Other hierarchical schemes are also feasible, but in order to avoid repeated evaluation for each function call, it is generally most efficient to rearrange the addresses in the master address array 50 according to their hierarchies as they are registered.

In any event, at step 122 the pointer in field 73 of the operation notification object 70 (FIG. 6) is set to the first address in the array 79 as determined by the number of registered entries in the field 71. In the described embodiment, this corresponds to the most-recently registered extension. Finally, at step 126 the notification synchronization semaphore is released so that other extensions can be registered as previously described. At this time, the notification manager 32 is ready for pre-notification to begin.

Figure 10:
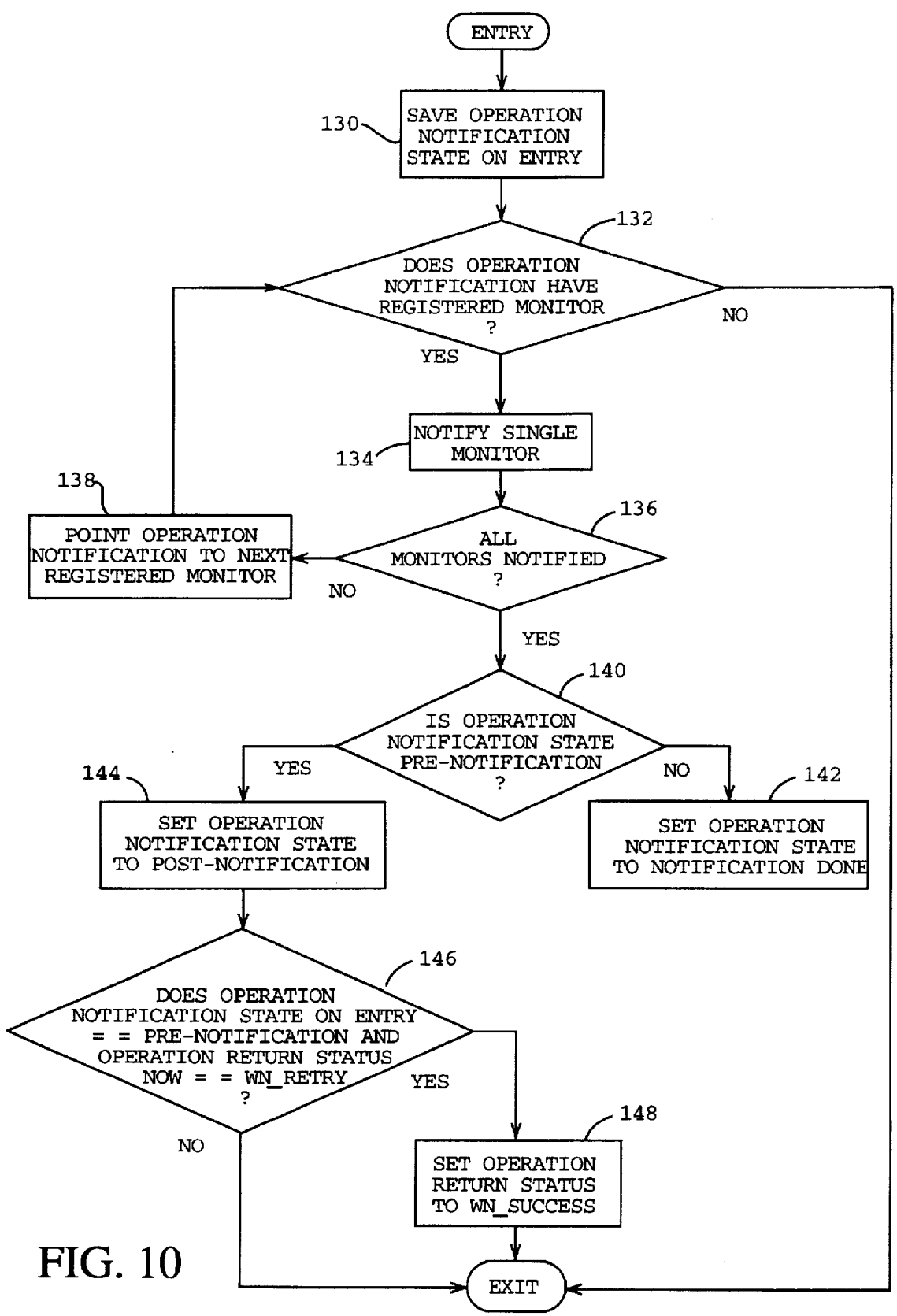
FIG 10 is a flow diagram illustrating the steps taken by the notification manager to notify each of the extensions both before and after the function call is made.

In accordance with one aspect of the invention, the notification procedure next begins to execute and pre-notify the appropriately registered extensions of the pending function call. FIG. 10 represents the notification procedure that is executed for both pre-notification and post-notification. Notwithstanding, the flow taken during the execution of this procedure will ordinarily vary according to the notification state, including the notification state at the time of entry. Thus, as shown in FIG. 10, at step 130 the operation notification state in field 74 at the time of entry, presently indicating pre-notification, is preserved.

At step 132, the counter in field 71 of the operation notification object 70 is queried to determine if any extensions at all are registered for the type of function about to be called. If the value is zero, then there are no extensions to notify. If there are none, the notification process is complete and the routine is exited. However, if at least one extension is registered, the routine calls the NotifySingleExtension routine at step 134, illustrated in more detail in FIG. 11.

Figure 11:
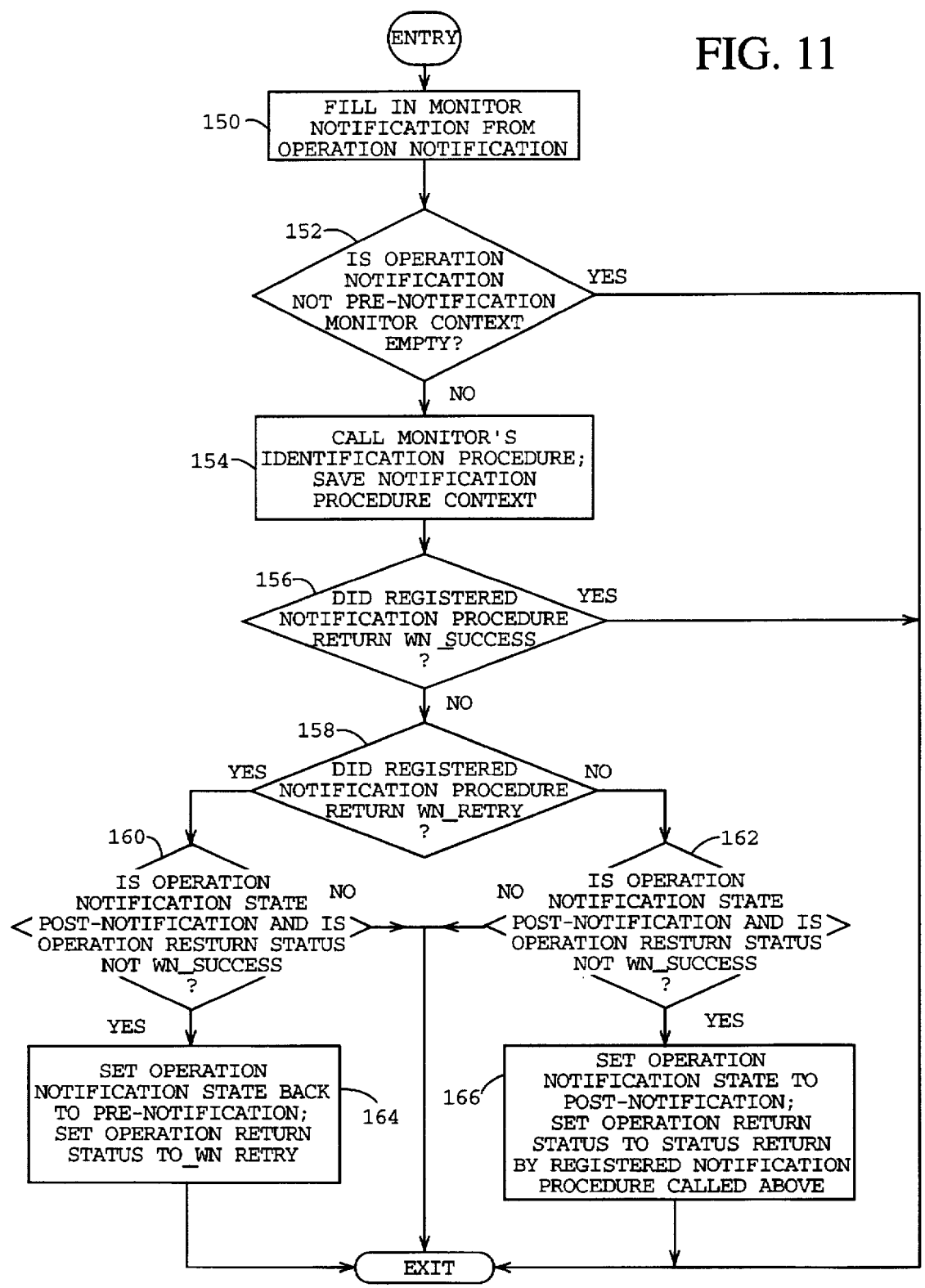
FIG. 11 is a flow diagram illustrating the steps taken by the notification manager when notifying individual ones of the registered extensions within the notification steps of FIG. 10.

As shown in FIG. 11, at step 150 the address of the first extension to be notified is obtained from field 73 of the operation notification object 70 (FIG. 6) to enable that particular extension to be notified. Next, at step 152, the state of the current notification operation is evaluated. As described in more detail below, this is because extensions not interested in post-notification will return a NULL context when called during pre-notification, enabling post-notification to be bypassed at step 152. Since the current state is pre-notification, the routine will continue on to step 154.

Figure 7:
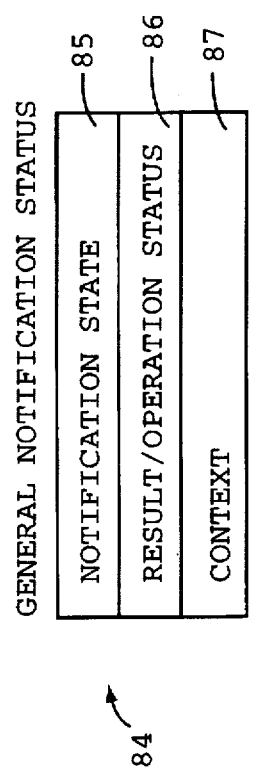
FIG. 7 illustrates the data structure of a status object passed as a parameter to the extensions during notification.

At step 154, the extension's procedure is called with two parameters, the general notification status 84 shown in FIG. 7, and the pointer to the operation specific data. This information is obtained from the operation notification object 70 (FIG. 6) immediately before calling the extension's registered procedure. Field 85 of the general notification status parameter 84 contains the notification state (pre-or post notification) which depends on whether the operation is about to be called or has been called. Field 86 contains the result status of the operation, which is invalid until the operation has been attempted. Field 87 is reserved for the extension's context, which may be filled in by the extension during pre-notification, and (if non-NULL) is returned to the extension during post-notification.

The contexts allow an extension to keep track of its context from pre-notification to post-notification for a particular operation. Note that because of multitasking, it is necessary to preserve the particular context for an operation so that the monitor uses the same context both during pre- and post-notification. This is done by returning the context of a called extension in field 86 for that particular operation, and storing the returned context in the context array 80 as previously described.

Once the extension's registered procedure is called, the extension may begin to provide its extended functionality. By way of example, if the purpose of the extension was to provide a user interface giving the user an opportunity to cancel the requested operation, such an interface would be provided to the user at this time.

Within its own executing procedure, the extension evaluates the pending function, and can either leave it alone or attempt to cancel it (for example as a result of a user's response to a query). This is accomplished by returning a value from the extension indicative of the result of the call thereto. In the preferred embodiment, during pre-notification, the only valid results are WN_SUCCESS OR WN_CANCEL.

The extension also returns its actual context or a NULL. At step 154 the context returned by the extension is preserved in a field of a data structure 80 containing such contexts. As shown in FIG. 6, each called extension address in the array of addresses 79 thus has a corresponding context or a NULL stored in a data structure 80 associated therewith.

If an extension is interested in further notification after the call, it returns both WN_SUCCESS and its actual (non-NULL) context. If the extension returns a NULL context, it indicates that it is not interested in post-notification.

The returned result is then evaluated beginning at step 156 (FIG. 11) to determine if it equals WN_SUCCESS. If so, the pre-notification procedure is complete for this particular extension, and the routine is exited. If not, the result is further evaluated.

Thus, step 158 is provided to determine if the extension returned a value of WN_RETRY. Although this is an invalid response during pre-notification, WN_RETRY is a valid response during post-notification. Consequently, rather than fail the requested operation, the notification manager assumes that the extension has erred and treats a WN_RETRY as a WN_SUCCESS during pre-notification. Thus, if WN_RETRY is returned, at step 158 the procedure branches to step 160. Step 160 exits the routine immediately because the operation state is not equal to post-notification.

Assuming however that neither WN_SUCCESS nor WN_RETRY was returned, the notification manager fails the requested operation by branching to step 162, wherein the operation state and the return status are further evaluated. Since at step 162 the operation notification state is pre-notification, the process branches to step 166, wherein the general notification status data block of FIG. 7 has its status field filled in with the status returned by the notification procedure. Ordinarily this would equal WN_CANCEL, although it can (erroneously) be another value. Additionally, at step 166 the notification state is also set to post-notification. This enables extensions that had previously been notified of the pending operation to be informed, in a subsequent post-notification process, that the call was cancelled. Post-notification will be described in more detail below.

Returning to FIG. 10, at step 136 the notification operation is evaluated to determine if all extensions have been notified. Note that at step 136 notification continues even if the operation was cancelled by an extension, although the cancellation has converted the notification state to post-notification.

Assuming that the requested operation was not cancelled, after the first single extension has been notified, pre-notification of the next extension, if any, takes place. Thus, step 136 determines whether the number of extensions pre-notified equals the total number registered entries in field 71 of the operation notification object 70. If not, pre-notification continues at step 138.

At step 138, the address of the next pointer is calculated based on the 32 bit-offset from the previous address. Since pre-notification occurs in the reverse order of registration, the pointer in field 73 (FIG. 6) is set to the next address in the reverse-ordered array 79. If no extensions cancel the operation, the process of notifying each extension continues until all extensions have been pre-notified.

Once all extensions have been notified, at step 140 the notification manager checks the notification state to determine if it is at pre-notification. If it is not, then at step 142 it is set to "notification done" and the notification routine is exited since both pre- and post-notification have been completed. If the notification state is pre-notification, at step 144 the state is set to post-notification since only pre-notification has been completed.

If the state is at pre-notification, step 146 is executed. Step 146 evaluates the notification state that was preserved at step 130 to determine if the state was pre-notification before any of the extensions were pre-notified. If so, and if the last status returned came back WN_RETRY, the return status is converted to WN_SUCCESS, since, as described previously, a WN_RETRY returned during pre-notification is treated as WN_SUCCESS. This prevents an erroneous WN_RETRY from being associated with a cancelled operation.

After a pre-notification in which all extensions returned a WN_SUCCESS (or WN_RETRY), the requested operation is sent to one or more of the network providers. For example, a request to add a network connection will be sent to all network providers until either a connection is made or there are no more providers. An extension may or may not have modified the operation specific data accompanying the request.

Once called, a network provider may also wish to see the context of a notification procedure. For example, the context may identify information telling the network provider the number of times to retry a failed operation, or instructing the network provider to reverse a previous operation if the current operation fails. A procedure, NPSNotifyGetContext, is provided to return the correct context for the current notification object.

Figure 13:
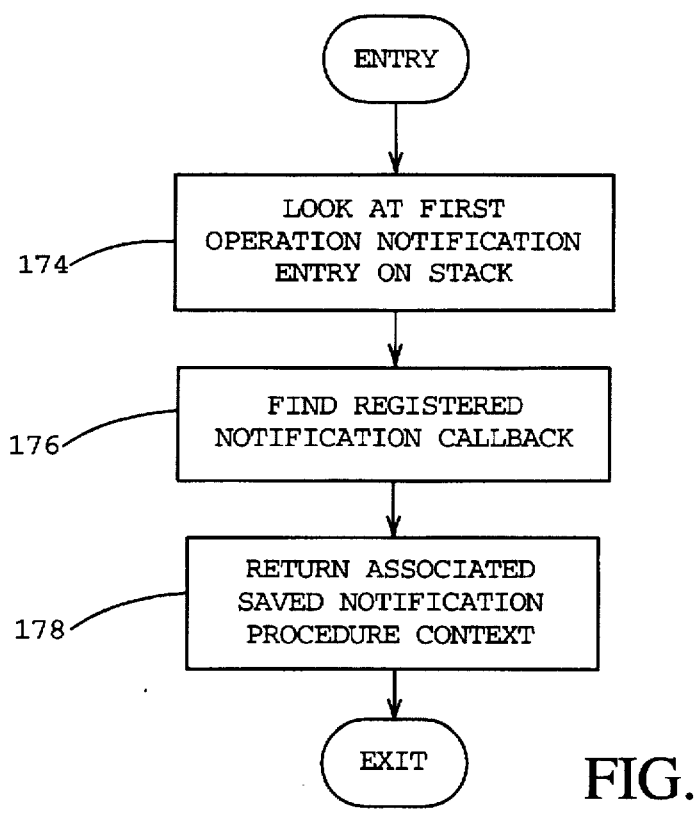
FIG. 13 is a flow diagram illustrating the steps taken by the notification manager when a routine is called by a service provider to obtain the context of a registered extension.

As a consequence of multitasking, it is not a simple matter for a provider to keep track of its extension's context for a given operation. However, it may be indirectly obtained via the NPSNotifyGetContext procedure. This is possible because it is only valid to call NPSNotifyGetContext from a network provider when that network provider is performing an operation. As a result, the first operation notification object within the linked list of such objects for the current thread (which corresponds to the type of operation being requested), is the correct object for this operation, i.e., the bottom one on the stack. Thus, as shown in FIG. 13, at step 174 the NPSNotifyGetContext procedure first determines which of the linked notification objects corresponds to the request.

Secondly, at step 176 the NPSNotifyGetContext procedure finds the registered callback address in the next pointer field 73 of notification object 70 (FIG. 6). This is accomplished by evaluating all of the registered callback procedures in the correct operation notification object's address array until it finds the one passed in as an input parameter. Finally, at step 178 the procedure uses this address to find the associated context previously saved during pre-notification (at step 154 of FIG. 11).

At this time the service provider has completed its handling of the call, and consequently the notification manager 32 begins executing the post-notification procedure. In addition, if a requested operation was cancelled by an extension, post-notification is similarly provided to all pre-notified extensions to inform them of the cancellation. As with the pre-notification procedure, FIGS. 10 and 11 show the operational flow during the post-notification procedure.

If no cancellation has occurred, at step 130 the operation notification state on entry is preserved. At this time, it is at post-notification because step 144 was executed after pre-notification was completed. It should be noted that if a cancellation has induced the post-notification, the notification procedure is still looping within steps 134 to 138, with the notification state having been set to post-notification at step 166 of FIG. 11. Regardless of the reason for post-notification, since at least one procedure has been registered, post-notification begins by individually notifying the extensions at step 134 until all interested extensions have been post-notified.

As shown at step 150 of FIG. 11, the address of the first extension to be post-notified is obtained from field 73 of the operation notification object 70 (FIG. 6) to enable that extension to be notified. Post-notification reverses the order of pre-notification, i.e., the first extension that is eligible for post-notification is the last extension that was pre-notified. An extension that cancels an operation is not post-notified of its own cancellation.

Moreover, only extensions that returned a non-NULL context are post-notified. Thus, at step 152, wherein the state of the current notification operation is presently post-notification in this example, a NULL extension context causes the routine to be exited. If instead the context was given a value, the next registered procedure is called at step 154.

Each registered procedure that is called returns a result to the notification manager for validation. The only valid result during post-notification is either WN_SUCCESS or WN_RETRY. Thus, at step 156 the executing procedure first evaluates the result to see if a WN_SUCCESS is returned. If so, the NotifySingleExtension procedure is exited since post-notification is completed for that extension. If not, the procedure continues to step 158.

At step 158, the result is evaluated to determine if the extension is requesting a retry by returning WN_RETRY, and if so, the procedure branches to step 160. However, only failed operations may be retried, and thus step 160 checks to determine if the requested operation was performed (i.e., the state is post-notification) and if the requested operation was not actually successful. If not, the routine is exited.

Likewise, the routine is exited at step 162 if any result: other than WN_SUCCESS or WN_RETRY was returned during post-notification. Thus, if WN_CANCEL is returned, it is treated as if WN_SUCCESS was returned since it is too late to cancel an already attempted operation.

However, if the requested operation was attempted and failed, and the extension has requested a retry, step 164 is executed. Step 164 ensures that before a retry is attempted, all other registered extensions are again pre-notified that the operation is about to occur anew. The pre-notification is accomplished by resetting the notification state to pre-notification and the operation return status to WN_RETRY (in fields 74 and 75 of the operation notification object). As before, with pre-notification induced by a retry, the registered extensions will be pre-notified in the reverse order in which they were loaded.

During a retry the extensions are aware that the operation is being retried, so that they can operate accordingly. For example, an extension may decrement an internal retry counter so that a retry may be reattempted up to a fixed number of times before a different action is taken.

Assuming that no retries have been requested or that all retries are completed, all the interested extensions are eventually post-notified to satisfy step 136. Thus, at step 140, the post-notification state causes the notification procedure to branch to step 142, where the state is set to notification done. At this time, notification, both pre- and post-, is now complete.

Figure 12:
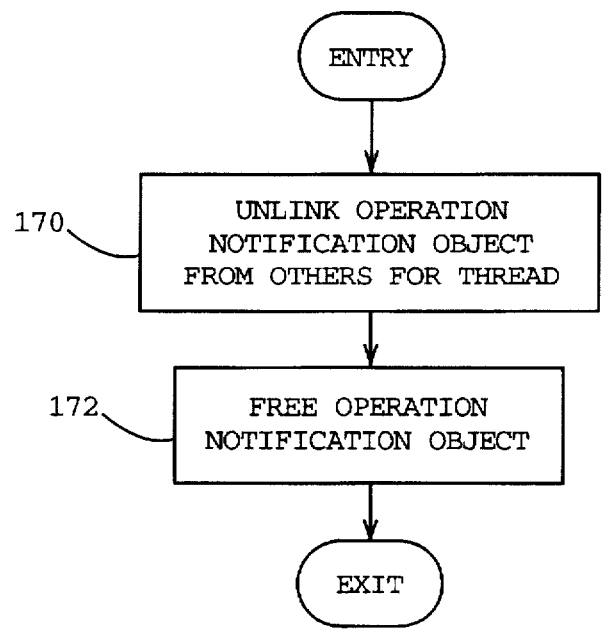
FIG. 12 s a flow diagram illustrating the steps taken by the notification manager at the end of the notification process.

The procedure represented in FIG. 12, NotifyEnd, is then executed. This procedure, also shown in FIG. 2B as step 21, first unlinks the operation notification object from other such objects at step 170 (FIG. 12), and at step 172 frees the operation notification object allocated in the MPR's memory so that the space is again available.

Finally, as shown as step 22 in FIG. 2B, the result is returned to the application program. Of course, one of the extensions may have altered the actual result received during the operation.

By way of example, when an application program calls a function requesting connection to a network server, e.g., WNetAddConnection2( ), the function ordinarily returns a value to the application program. These values include WN_SUCCESS (indicative of a successfully added connection) or WN_NET_ERROR (indicative of a network error). One way in which to enhance the WNetAddConnection2( ) function is to offer the user an opportunity (or automatically implement a routine) to dial up a network when a network error indicative of an unconnected computer is returned. Thus, instead of immediately failing the request, the extension to the network provider offers the user an opportunity to dial-up a connection to the network.

To accomplish this extended functionality, the extension must first register with the notification manager 32 as previously described. During registration, it passes as the type parameter NotifyType the value NotifyAddConnection, since it is interested only in attempts to add connections to a network. It also passes the address of the procedure it wants called during pre- and post-notification in the NotifyCallback parameter.

Figure 14A:
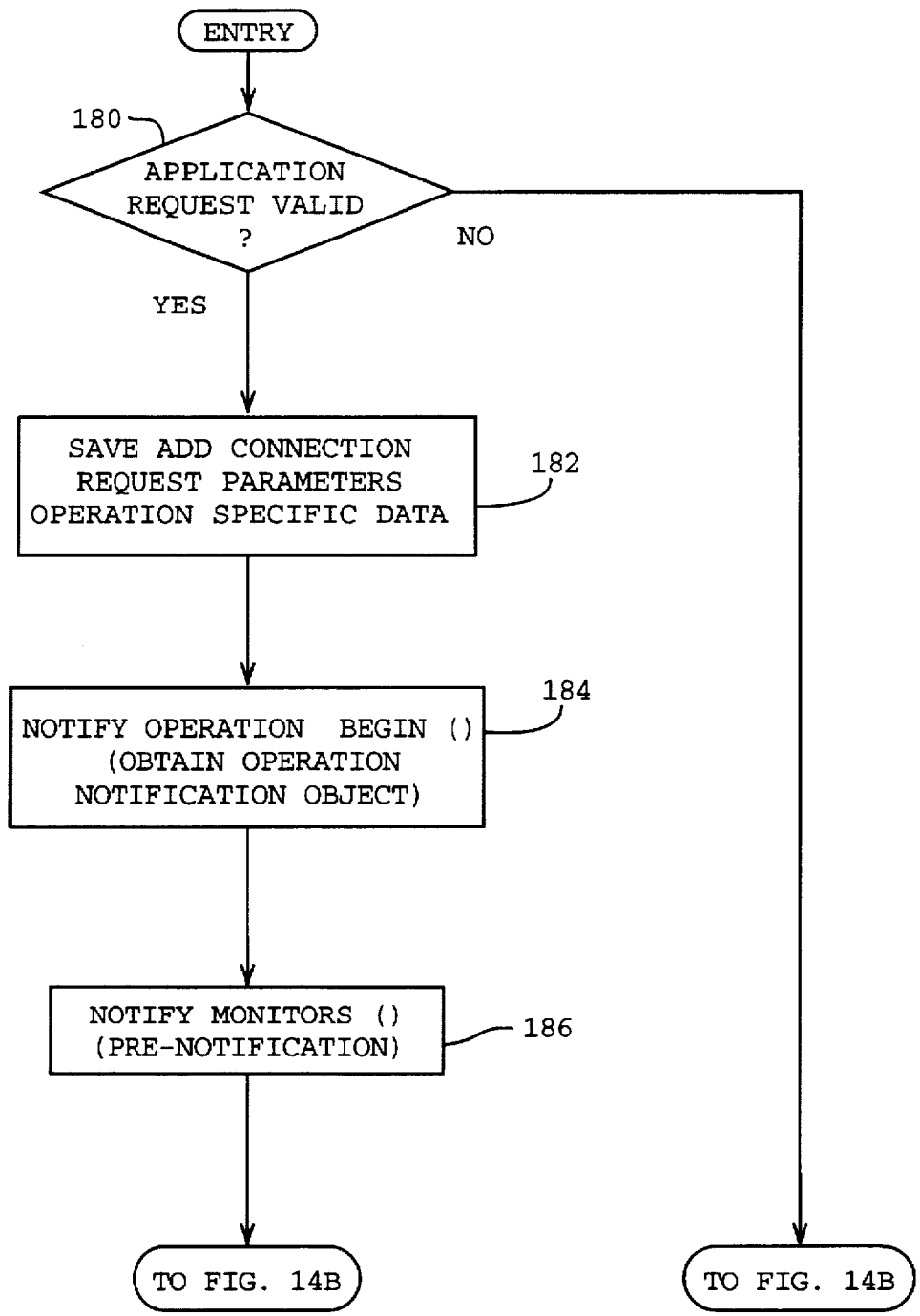
FIGS. 14A–14B comprise a flow diagram illustrating the steps taken by the notification manager to extend a function called by an application program attempting to add a network connection.
Figure 14B:
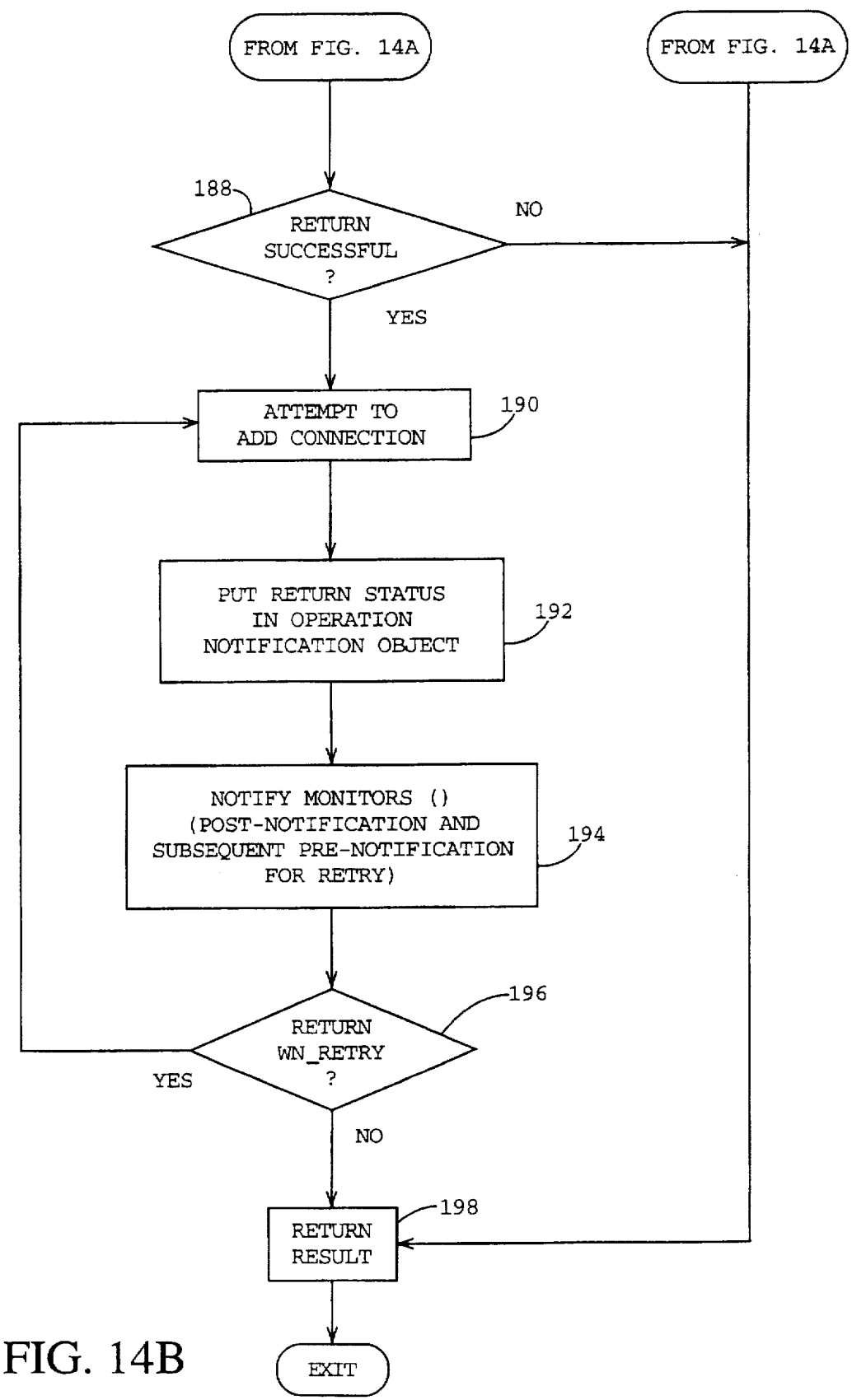

FIGS. 14A and 14B show the flow of operation that occurs during this procedure. At step 180, the MPR 26 first determines if the application request from the API 25 is valid. If not, an error is immediately returned to the application program.

If the call is valid, at step 182 the parameters passed with the add connection request, e.g., various information about the connection, are saved in the operation specific data structure 82 (FIG. 6). At step 184, the NotifyBegin procedure is called, which as previously described, allocates the operation notification object 70 for this particular request.

At step 186, this extension and any others are notified of the existence of the pending call. When this particular extension is notified, it returns its actual context, and not a NULL, because is interested in whether the call will succeed. It will also return a WN_SUCCESS to indicate that it was properly notified and does not wish to cancel the call.

At step 188, the result returned from the first extension is evaluated, provided that no other extensions cancelled the operation before the first extension was pre-notified. If there was no such cancellation, at step 190 the call is passed to the network provider to attempt to add the connection.

Each network provider is called in turn in an attempt to add the connection, until either the connection is added or no more network providers can be called. In either event, the status of the operation, indicating success or failure, is returned and placed in the operation notification object at step 192.

At step 194, the extensions are post-notified of the result. The particular dial-up routine of the present example acts only if the result indicated a failure. If so, the routine may interface with the user to determine whether to dial the connection, or may be already configured for automatic dial-up.

If it dials up to establish a communication path to a network server, it will retry the operation. Thus, it will return a WN_RETRY during the post-notification. During the retry, the AddConnection attempt may be successful, in which case the application program has added a connection without ever having received a failed operation result. If not successful after a predetermined number of retries, the extension will return some other status.

The following provides the application program interface specifications for a number of connection functions that may be called in the Microsoft® Windows™ 95 environment. The function calls, parameters and return codes described herein correspond to API calls dealing with connections, for example, those which may be used in the above described extension that monitors for add connection requests.

WNetAddConnection

This function allows the caller to redirect (connect) a local device to a network resource. If successful, the connection will be made persistent.

```
DWORD
WNetAddConnection(
    LPTSTR  lpRemoteName,
    LPTSTR  lpPassword,
    LPTSTR  lpLocalName
);
```
Parameters:

| | |
|---|---|
| lpRemoteName | Specifies the network resource to connect to. This is limited to MAX_PATH. |
| lpPassword | Specifies the password to be used in making the connection. The NULL value or string may be passed in to indicate that the caller wants the network to use the best password(s) it has available (such as no password, a default password, or an internally cached password). |
| lpLocalName | This should contain the name of a local device to be redirected, such as "F:" or "LPT1". The string is treated in a case insensitive manner, and may be the empty string (or NULL) to indicate the connection to the network resource is to be made without a device redirection (i.e., deviceless connection). |

Return Values:

WN_SUCCESS if the call is successful. Other error codes include:

ERROR_BAD DEV_TYPE—The device type and the resource type do not match.

WN_BAD_NETNAME—lpRemoteName is not acceptable to any NP

WN_BAD_LOCALNAME—lpLocalName is invalid.

WN_BAD_PASSWORD—invalid password, or the connection requires additional authentication not provided by the caller (e.g., a username)

WN_ALREADY_CONNECTED—lpLocalName is already connected to a network drive or is to a local drive that is already in use locally (e.g. is used for a hard drive or RAM drive).

WN_ACCESS_DENIED—access denied (user may need to logon)

WN_NO_NETWORK—network is not present

WN_CANNOT_OPEN_PROFILE—Unable to open the user profile to process persistent connections.

WN_BAD_PROFILE—The user profile is in an incorrect format.

WN_FUNCTION_BUSY—The MPR or NP is busy (possibly initializing). The caller should retry.

WN_NO_NET_OR_BAD_PATH—the operation could not be handled either because a network component is not started or the specified name could not be handled.

WN_EXTENDED_ERROR—a network specific error occurred. WNetGetLastError should be called to obtain a description of the error.

WNetAddConnection2

This function allows the caller to redirect (connect) a local device to a network resource. It is similar to WNetAddConnection, except that it takes a pointer to a NETRESOURCE structure to describe the network resource to connect to. It also takes the additional parameters lpUserID and dwFlags.

```
DWORD
WNetAddConnection2(
    LPNETRESOURCE  lpNetResource,
    LPTSTR  lpPassword,
    LPTSTR  lpUserID,
    DWORD  dwFlags
);
```
Parameters:

| | |
|---|---|
| lpNetResource | Specifies the network resource to connect to. This structure is defined the section describing Enumeration APIs. The following fields must be set when making a connection, the others are ignored. |
| lpRemoteName | Specifies the network resource to connect to. This is limited to MAX_PATH. |
| lpLocalName | This specifies the name of a local device to be redirected, such as "F:" or "LPT1". The string is treated in a case insensitive manner, and may be the empty string (or NULL) in which case a connection to the network resource is made without making a redirection. |
| lpProvider | Specifies the NP to connect to. If NULL or empty string, Windows will try each NP in turn. The caller should set lpProvider only if it knows for sure which network it wants. Otherwise, it is preferable to let Windows |

-continued

| | |
|---|---|
| | determine which NP the network name maps to. If this is non NULL, Windows will try the named NP and no other. |
| dwType | Specifies the type of resource to connect to. It must be RESOURCETYPE_DISK or RESOURCETYPE_PRINT if lpLocalName is not the empty string. It may also be RESOURCETYPE_ANY if lpLocalName is the empty string. |
| lpPassword | Specifies the password to be used in making the connection, normally the password associated with lpUserID. A NULL value or string may be passed in to indicate to the function to use the current default password. |
| lpUserID | This specifies the identity of the user needed to make the connection. If NULL, a default will be applied. This is used when the user wishes to connect to a resource, but has a different user name or account assigned to him for that resource. This identification represents a security context, and is NP specific. |
| dwFlags | This is a bit mask which may have any of the following bits set: |

CONNECT_UPDATE_PROFILE Used if the connection should be made persistent. If set, Windows automatically restores this connection when the user logs on to the network. A connection is only made persistent if the connection was successful.

Return Values:
  WN_SUCCESS if the call is successful.
  Other error codes include:
  ERROR_BAD_DEV_TYPE—The device type and the resource type do not match.
  WN_BAD_PROVIDER—lpProvider does not match any NP
  WN_BAD_NETNAME—lpRemoteName is not acceptable to any NP
  WN_BAD_LOCALNAME—lpLocalName is invalid.
  WN_BAD_PASSWORD—invalid password, or the connection requires additional authentication not provided by the caller (e.g., a username)
  WN_ALREADY_CONNECTED—lpLocalName is already connected to a network drive or is to a local drive that is already in use locally (e.g. is used for a hard drive or RAM drive).
  WN_ACCESS_DENIED—access denied (user may need to logon)
  WN_CANNOT_OPEN_PROFILE—Unable to open the user profile to process persistent connections.
  WN_BAD_PROFILE—The user profile is in an incorrect format.
  WN_FUNCTION_BUSY—The MPR or NP is busy (possibly initializing). The caller should retry.
  WN_NO_NETWORK—network is not present
  WN_NO_NET_OR_BAD_PATH—the operation could not be handled either because a network component is not started or the specified name could not be handled.
  WN_EXTENDED_ERROR—a network specific error occurred. WNetGetLastError should be called to obtain a description of the error.

WNetAddConnection3

This function is used to establish a connection to a network object The routine may optionally prompt the user for login or authentication.

```
DWORD
WNetAddConnection3(
    HWND hwndOwner,
    LPNETRESOURCE lpNetResource,
    LPTSTR lpPassword,
    LPTSTR lpUserID,
    DWORD dwFlags
);
```

Parameters:

| | |
|---|---|
| hwndOwner | A handle to a window which should be the owner for any messages or dialogs the network provider might display. This is used if CONNECT_INTERACTIVE is set. |
| lpNetResource | Specifies the network resource to connect to. This structure is defined the section describing Enumeration APIs. The following fields must be set when making a connection, the others are ignored. |
| lpRemoteName | Specifies the network resource to connect to. This is limited to MAX_PATH. |
| lpLocalName | Pointer to a buffer that specifies the local device name that is to be redirected, such as "F:" or "LPT1". The string is treated in a case insensitive manner, and may be the empty string (or NULL) in which case a connection to the network resource is made without making a redirection. |
| lpProvider | Specifies the NP to connect to. If NULL or empty string, Windows will try each NP in turn. The caller should set lpProvider only if it knows for sure which network it wants. Otherwise, it is preferable to let Windows determine which NP the network name maps to. If this is non NULL, Windows will try the named NP and no other. |
| dwType | Specifies the type of resource to connect to. It must be RESOURCETYPE_DISK or RESOURCETYPE_PRINT if lpLocalName is not the empty string. It may also be RESOURCETYPE_ANY if lpLocalName is the empty string. |
| lpPassword | Specifies the password to be used in making the connection, normally the password associated with lpUserID. A NULL value or string may be passed in to not specify the password. If the password is invalid or not specified, then the function tries to use the current default password. If this fails and CONNECT_INTERACTIVE is set, the function posts an appropriate dialog asking the user to type/retype the password. |

| | |
|---|---|
| lpUserID | This specifies the identity of the user needed to make the connection. If NULL, a default will be applied. This is used when the user wishes to connect to a resource, but has a different user name or account assigned to him for that resource. This identification represents a security context, and is NP specific. This user specific information is stored to be subsequently used in re-establishing the connection (using a non-default username or telephone number, for example). |
| dwFlags | Any combination of the following values: |
| CONNECT_TEMPORARY | The connection is being established for browsing purposes and can be released quickly. |
| CONNECT_INTERACTIVE | May have interaction with the user for authentication purposes. |
| CONNECT_PROMPT | Do no use any defaults for usernames or passwords without offering user the chance to supply an alternative. This flag is only valid if CONNECT_INTERACTIVE is set. |
| CONNECT_UPDATE_PROFILE | If the connection should be made persistent. If set, the connection is automatically restored every time the user starts up and logs on to the network. A connection is only made persistent if the connection was successful. This flag is only valid if lpLocalName specifies a local device to redirect. |
| CONNECT_UPDATE_RECENT | If the connection should be put in the recent connection list. If set, and the connection is successfully added, it will be put in the recent connection list. This flag should typically have the opposite value to CONNECT_TEMPORARY. |

Return Values:

WN_SUCCESS if the call is successful.

WN_CANCEL—the user cancelled the add connection attempt through some user interface.

WN_BAD_PROVIDER—lpprovider does not match any NP

WN_BAD_NETNAME—lpRemoteName is not acceptable to any NP

WN_BAD_LOCALNAME—lpLocalName is invalid.

WN_BAD_PASSWORD—bad password and CONNECT_INTERACTIVE is not set.

WN_NOT_AUTHENTICATED—the call failed because the connection requires additional authentication information (e.g., a username or a password), not provided by the caller or the user through a dialog.

WN_NOT_LOGGED_ON—a system logon needs to occur before a network connection can be added.

WN_ALREADY_CONNECTED—lpLocalName already connected or is to a local drive that is already in use locally (e.g. is used for a hard drive or RAM drive).

WN_ACCESS_DENIED—access denied.

WN_CANNOT_OPEN_PROFILE—Unable to open the user profile to process persistent connections.

WN_BAD_PROFILE—The user profile is in an incorrect format.

WN_FUNCTION_BUSY—The MPR or NP is busy (possibly initializing). The caller should retry.

WN_NO_NETWORK—network is not present

WN_NO_NET_OR_BAD_PATH—the operation could not be handled either because a network component is not started or the specified name could not be handled.

WN_EXTENDED_ERROR—a network specific error occurred. WNetGetLastError should be called to obtain a description of the error.

WNetUseConnection

This function is used to establish a connection to a network object, especially for browsing. The function may optionally prompt the user for login or authentication. The connection is usually on a redirected local drive or a reference counted session (in which case this call increments the reference count to the session), although for some networks it may be on a non-reference counted session that does not have a local device redirection. See WNetCancelConnection2 for details on cancelling the connection.

In addition, for file and disk resources, this API can return a name for the connection that can be pre-pended to file system requests on the network resource (e.g. "\\server\share" or "F:"). This enables directory service lookup. The API can also auto-pick a local device for redirecting local devices to networks that require local device redirection.

```
DWORD
WNetUseConnection(
    HWND hwndOwner,
    LPNETRESOURCE lpNetResource,
    LPTSTR lpPassword,
    LPTSTR lpUserID,
    DWORD dwFlags,
    LPTSTR lpAccessName,
    LPDWORD lpBufferSize,
    LPDWORD lpResult
);
```

Parameters:

| | |
|---|---|
| hwndOwner | A handle to a window which should be the owner for any messages or dialogs the network provider might display. This is used if CONNECT_INTERACTIVE is set. |
| lpNetResource | Specifies the network resource to connect to. This structure is defined the section describing Enumeration APIs. The following fields must be set when making a connection, the others are ignored. |
| lpRemoteName | Specifies the network resource to connect to. |
| lpLocalName | Pointer to a buffer that specifies the local device name that is to be redirected, such as "F:" or |

| | |
|---|---|
| | "LPT1". The string is treated in a case insensitive manner, and may be the empty string (or NULL) in which case either a connection to the network resource is made without making a redirection or, if CONNECT_REDIRECT is set or the network requires a redirected local device and none is specified a redirection is picked by the system which is returned in lpAccessName. |
| lpProvider | Specifies the NP to connect to. If NULL or empty string, Windows will try each NP in turn. The caller should set lpProvider only if it knows for sure which network it wants. Otherwise, it is preferable to let Windows determine which NP the network name maps to. If this is non NULL, Windows will try the named NP and no other. |
| dwType | Specifies the type of resource to connect to. It is most efficient to use a specific resource type (RESOURCETYPE_DISK or RESOURCETYPE_PRINT). It may be RESOURCETYPE_ANY if lpLocalName is the empty string and CONNECT_REDIRECT is not set. |
| lpPassword | Specifies the password to be used in making the connection, normally the password associated with lpUserID. A NULL value or string may be passed in to not specify the password. If the password is invalid or not specified, then the function tries to use the current default password. If this fails and CONNECT_INTERACTIVE is set, the function posts an appropriate dialog asking the user to type/retype the password. |
| lpUserID | This specifies the identity of the user needed to make the connection. If NULL, a default will be applied. This is used when the user wishes to connect to a resource, but has a different user name or account assigned to him for that resource. This identification represents a security context, and is NP specific. This user specific information is stored to be subsequently used in re-establishing the connection (using a non-default username or telephone number, for example). |
| dwFlags | Any combination of the following bit values: |
| CONNECT_TEMPORARY | The connection is being established for browsing purposes. |
| CONNECT_INTERACTIVE | May have interaction with the user for authentication purposes. |
| CONNECT_PROMPT | Do no use any defaults for usernames or passwords without offering user the chance to supply an alternative. This flag is only valid if CONNECT_INTERACTIVE is set. |
| CONNECT_UPDATE_PROFILE | If the connection should be made persistent. If set, the connection is automatically restored every time the user starts up and logs on to the network. A connection is only made persistent if the connection was successful. This flag is only valid if lpLocalName specifies a local device to redirect, as otherwise it is ignored. |
| CONNECT_UPDATE_RECENT | If the connection should be put in the recent connection list. If set, and the connection is successfully added, it will be put in the recent connection list only if it has a redirected local device associated with it. |
| CONNECT_REDIRECT | If set, force the auto-picking of a local device for redirection when making the connection, otherwise only auto-pick a local device for redirection if the network requires it to make a connection. This flag is ignored if lpLocalName specifies a local device to redirect (since a redirection will always be attempted to the local device name specified in lpLocalName). Otherwise, setting this flag is invalid if either lpAccessName does not point to a return buffer (since the caller will not readily know how to access the resource) or dwType is RESOURCETYPE_ANY. | lpAccessName Points to a buffer to receive the name that can be used to make system requests on the connection. This conversion is useful for adding connections to aliased resources, such as through a directory service, and for autopicking of local devices for redirection.

If lpLocalName specifies a local device, then this buffer is optional, and if specified will have the local device name copied into it. Otherwise, if the network requires a local device redirection, or CONNECT_REDIRECT is set, then this buffer is required and the redirected local device is returned here. Otherwise, the name copied into the buffer is that of a remote resource, and if specified, this buffer must be at least as large as the string pointed to by lpRemoteName.

| | |
|---|---|
| lpBufferSize | This is used to specify the size of the lpAccessName buffer passed in. If the call fails because the |

| | |
|---|---|
| lpResult | buffer is not big enough, this location will be used to return the required buffer size. Pointer to a DWORD in which is returned additional information about the connection. Currently has the following bit value: |
| CONNECT_REFCOUNT | The connection was made without using a local device redirection and is to a network that understands reference counted sessions. If this bit is not set, then calling WNetCancelConnection2 will end the session and possibly interfere with other threads or processes that may be using the session. If this bit is set then calling WNetCancelConnection2 with CONNECT_REFCOUNT set in the dwFlags parameter will decrement the reference count to the connection and not interfere with other threads that are using the session. |
| CONNECT_LOCALDRIVE | If set, the connection was made using a local drive redirection. If lpAccessName points to a buffer then the local drive is copied to the buffer. |

Return Values:

WN_SUCCESS if the call is successful.

WN_CANCEL—the user cancelled the add connection attempt through some user interface.

WN_BAD_PROVIDER—lpProvider does not match any NP.

WN_BAD_NETNAME—lpRemoteName is not acceptable to any NP.

WN_BAD_LOCALNAME—lpLocalname is invalid.

WN_BAD_PASSWORD—bad password and CONNECT_INTERACTIVE is not set.

WN_BAD_VALUE—one of the following: lpRemoteName is NULL; lpRemoteName is not NULL, and lpBufferSize is either NULL or points to zero; dwType is neither RESOURCETYPE_DISK nor RESOURCETYPE_PRINT, and either CONNECT_REDIRECT is set in dwFlags or lpLocalName is not NULL or the connection is to a network that requires a local device redirection to make a connection;

WN_BAD_POINTER—lpAccessName does not point to a buffer and either CONNECT_REDIRECT is set in dwFlags or a connection is being attempted to a network that requires a local device redirection which is not specified in lpLocalName.

WN_MORE_DATA—the lpAccessName buffer is too small. If a local device is redirected, the buffer needs to large enough to contain the local device name. Otherwise the buffer needs to be large enough to contain either the string pointed to by lpRemoteName or the name of the connectable resource whose alias is pointed to by lpRemoteName. If this status is returned, then no connection has been made.

WN_NO_MORE_ENTRIES—a local redirection cannot be auto-picked because all of the valid local devices for the network are in use.

WN_NOT_AUTHENTICATED—the call failed because the connection requires additional authentication information (e.g., a username or a password), not provided by the caller or the user through a dialog.

WN_NOT_LOGGED_ON—a system logon needs to occur before a network connection can be added.

WN_ALREADY_CONNECTED—lpLocalName is already connected to a network drive or is to a local drive that is already in use locally (e.g. is used for a hard drive or RAM drive).

WN_ACCESS_DENIED—access denied.

WN_CANNOT_OPEN_PROFILE—Unable to open the user profile to process persistent connections.

WN_BAD_PROFILE—The user profile is in an incorrect format.

WN_FUNCTION_BUSY—The MPR or NP is busy (possibly initializing). The caller should retry.

WN_NO_NETWORK—network is not present.

WN_NO_NET_OR_BAD_PATH—the operation could not be handled either because a network component is not started or the specified name could not be handled.

WN_EXTENDED_ERROR—a network specific error occurred. WNetGetLastError should be called to obtain a description of the error.

WNetCancelConnection

This function breaks an existing network connection. This function is equivalent to WNetCancelConnection2 with CONNECT_UPDATE_PROFILE set for dwFlags, i.e., the list of persistent connections will be updated so that Windows will no longer restore this connection.

```
DWORD
WNetCancelConnection(
    LPTSTR lpName,
    BOOL fForce
);
```

Parameters:

| | |
|---|---|
| lpName | The name of either the redirected local device or the remote network resource to disconnect from. In the former case, only the redirection specified is broken, in the latter case only the deviceless connection to the remote network resource is broken. |
| fForce | Used to indicate if the disconnect should be done forcefully in the event of open files or jobs on the connection. If FALSE is specified, the call will fail if there are open files or jobs. |

Return Values:

WN_SUCCESS if the call is successful. If the connection does not exist for any of the NPs but is persistent and the MPR successfully deleted the persistent connection, this is treated as a successful call.

Other error codes include:

WN_NOT_CONNECTED—lpname not a redirected (nor persistent) device, or not currently connected to lpName WN_CANNOT_OPEN_PROFILE—Unable to open the user profile to process persistent connections.

WN_DEVICE_IN_USE—The device is in use by an active process and cannot be disconnected.

WN_BAD_PROFILE—The user profile is in an incorrect format.

WN_OPEN_FILES—there are open files and fForce was FALSE.

WN_FUNCTION_BUSY—The MPR or NP is busy (possibly initializing). The caller should retry.

WN_EXTENDED_ERROR—a network specific error occurred. WNetGetLastError should be called to obtain a description of the error.

WNetCancelConnection2

This function breaks an existing network connection. It may also be used to remove a persistent connection for which there is no existing network connection. When WNet:CancelConnection2 is called it removes the connection entirely if it is to a redirected local device or a non-reference counted session, or if CONNECT_REFCOUNT bit is not set in the dwFlags parameter. Otherwise WNetCancelConnection2 decrements the reference count to the session and removes the session when it is no longer being referenced.

```
DWORD
WNetCancelConnection2(
    LPTSTR lpName,
    DWORD dwFlags,
    BOOL fForce
);
```

Parameters:

| | |
|---|---|
| lpName | The name of either the redirected local device or the remote network resource to disconnect from. In the former case, only the redirection specified is broken, in the latter case only the deviceless connection to the remote network resource is broken. If WNetUseConnection was called to make the connection with a non-empty lpLocalName field, then lpName is set to this, otherwise it should be the name that was returned in the lpAccessName field. |
| dwFlags | This is a bit mask which may have any of the following bits set: |
| CONNECT_UPDATE_PROFILE | If the disconnection should remain persistent. If set, Windows will no longer restore this connection when the user logs on. |
| CONNECT_REFCOUNT | If this bit is not set, the connection is to a redirected local device, or the connection is not reference counted, then the connection is cancelled completely (which will interfere with other threads or processes that are using the connection). If this bit is set and the connection supports reference counts then the reference count to the connection is decremented. When nothing is referencing the connection it is cancelled. |
| fForce | Used to indicate if the disconnect should be done forcefully in the event of open files or jobs on the connection. If FALSE is specified, the call will fail if there are open files or jobs. If TRUE is specified, then CONNECT_REFCOUNT must not be set in dwFlags. |

Return Values:

WN_SUCCESS if the call is successful. If the connection does not exist for any of the NPs but is persistent and the MPR successfully deleted the persistent connection, this is treated as a successful call.

Other error codes include:

WN_NOT_CONNECTED—lpName not a redirected or persistent device, or not currently connected to lpName.

WN_CANNOT_OPEN_PROFILE—Unable to open the user profile to process persistent connections.

WN_DEVICE_IN_USE—The device is in use by an active process and cannot be disconnected.

WN_BAD_PROFILE—The user profile is in an incorrect format.

WN_OPEN_FILES—there are open files and fForce was FALSE.

WN_FUNCTION_BUSY—The MPR or NP is busy (possibly initializing). The caller should retry.

WN_EXTENDED_ERROR—a network specific error occurred. WNetGetLastError should be called to obtain a description of the error.

As can be seen from the foregoing detailed description, there is provided a method and system that coordinates software extensions, thereby eliminating the deficiencies associated with independent extensions. The method and system extends called software routines without relinquishing control of the call to the extension, while further allowing extensions to operate correctly regardless of their load order and eliminating the need for individual extensions to manage the flow of control for function calls or handle the coordination of calls with other extensions. Existing extensions can be extended, as well as dynamically loaded and unloaded. The method and system functions within a layered operating system, and may provide a mechanism for coordinating extensions to networking functions.

What is claimed is:

1. In a computer system having at least one active application program capable of making calls to lower level functions, a method of extending the functionality of at least one of the lower level functions, comprising the steps of:

registering multiple extensions for a lower level function with a notification manager, the multiple extensions being capable of providing extended functionality to the lower level function;

intercepting a call from an application program to the lower level function;

notifying the appropriate registered multiple extensions of the existence of the call, thereby allowing the multiple extensions to provide extended functionality;

receiving a response from the notified multiple extensions before passing the call to the lower level function; and passing the call to the lower level function.

2. The method of claim 1 further comprising the steps of:
receiving the result of the call from the lower level function;
notifying the appropriate registered multiple extensions of the result of the call; and
enabling one of the appropriate registered multiple extensions to modify the result of the call.

3. The method of claim 1 further comprising the step of receiving a cancel request from one of the multiple extensions in response to the step of notifying the multiple extensions of the existence of the call.

4. The method of claim 3 further comprising the step of cancelling the request in response to the cancel request thereby providing extended functionality to the call.

5. The method of claim 2 wherein the step of enabling includes the step of receiving a retry request from said one extension in response to the step of notifying the multiple extensions of the result of the call.

6. The method of claim 5 further comprising the step of passing the call to the lower level function at least one additional time in response to the retry request, thereby providing extended functionality to the call.

7. The method of claim 2 wherein the step of enabling includes the step of converting a result indicative of failure to a result indicative of success.

8. The method of claim 2 further comprising the steps of 1) receiving information with respect to the call from the multiple extensions in response to the step of notifying the appropriate registered multiple extensions of the existence of the call, and 2) returning the received information to the multiple extensions while notifying the appropriate registered multiple extensions of the result of the call.

9. The method of claim 1 wherein each of the multiple extensions has a type-identifier associated therewith, and the step of registering comprises the step of storing the address of said each extension in memory according to the type-identifier.

10. A computer system for providing extended functionality to at least one existing function which is called from an application program, comprising:

a notification manager including means for intercepting calls to the function;

multiple extensions capable of providing extended functionality to a function;

means for communicating information from the notification manager to the multiple extensions in response to an intercepted call to the function, including information associated with the intercepted call; and means for communicating instructions from the multiple extensions to the notification manager in accordance with the multiple extensions' extended functionality in response to communicating information associated with the intercepted call to the multiple extensions and before passing the call to the function; and means for passing the intercepted call to the function.

11. The system of claim 10 further comprising a network server for performing the function, and wherein the means for passing the intercepted call to the function includes a network adapter.

12. The system of claim 10 further comprising means for receiving information from the called function, and means for communicating the received information from the notification manager to the extension.

13. The system of claim 12 wherein the means for communicating instructions includes means for communicating instructions in accordance with the received information.

* * * * *

UNITED STATES PATENT AND TRADEMARK OFFICE
CERTIFICATE OF CORRECTION

PATENT NO. : 5,764,985
DATED : June 9, 1998
INVENTOR(S) : SMALE

It is certified that an error appears in the above-identified patent and that said Letters Patent is hereby corrected as shown below:

ON THE TITLE PAGE:

Insert:   --[73]  Assignee:  Microsoft Corporation
                             One Microsoft Way
                             Redmond, WA --

Signed and Sealed this

Twenty-fifth Day of July, 2000

Attest:

Q. TODD DICKINSON

Attesting Officer

Director of Patents and Trademarks